US012775256B2

(12) United States Patent
Delaney et al.

(10) Patent No.: US 12,775,256 B2
(45) Date of Patent: Oct. 27, 2026

(54) ENVIRONMENTAL CONTROL UNIT, VOICE-ENABLED ASSIST DEVICE AND REMOTE SERVER SYSTEM

(71) Applicant: Lenovo (Singapore) Pte. Ltd., Singapore (SG)

(72) Inventors: Mark Patrick Delaney, Raleigh, NC (US); Russell Speight VanBlon, Raleigh, NC (US); John Carl Mese, Cary, NC (US); Nathan J. Peterson, Oxford, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 506 days.

(21) Appl. No.: 17/699,355

(22) Filed: Mar. 21, 2022

(65) Prior Publication Data

US 2022/0206449 A1 Jun. 30, 2022

Related U.S. Application Data

(63) Continuation of application No. 16/221,373, filed on Dec. 14, 2018, now abandoned.

(51) Int. Cl.
*G05B 19/042* (2006.01)

(52) U.S. Cl.
CPC .... *G05B 19/042* (2013.01); *G05B 2219/2614* (2013.01)

(58) Field of Classification Search
None
See application file for complete search history.

(56) References Cited

U.S. PATENT DOCUMENTS 8,019,567 B2 * 9/2011 Steinberg ............ G01M 99/005 165/238
9,298,197 B2 * 3/2016 Matsuoka ................ F24F 11/62
10,387,966 B1 * 8/2019 Shah ...................... G06Q 40/08
(Continued)

OTHER PUBLICATIONS

Herbon, Avi, Eugene Levner, and T. C. E. Cheng. "Perishable inventory management with dynamic pricing using time-temperature indicators linked to automatic detecting devices." International Journal of Production Economics 147 (2014): 605-613 (Year: 2014).*
(Continued)

*Primary Examiner* — Darlene Garcia-Guerra
(74) *Attorney, Agent, or Firm* — Brian J. Pangrle

(57) ABSTRACT

A system can include an environmental control unit that controls operation of heating, ventilation and air conditioning equipment at a site; a voice-enabled assistant device operatively coupled to the environmental control unit, where the voice-enabled assistant device transmits commands to the environmental control unit and receives time series temperature data from the environmental control unit for temperature at the site; and a remote server operatively coupled to the voice-enabled assistant device, where the remote server receives the time series temperature data from the voice-enabled assistant device and uses a time-dependent model to determine a depletion rate for material at the site based at least in part on the time series temperature data, where the time-dependent model accounts for consumption of the material with respect to time and degradation of the material with respect to time.

20 Claims, 13 Drawing Sheets

System 1200

(56) References Cited

U.S. PATENT DOCUMENTS

| | | | | |
|---|---|---|---|---|
| 10,713,726 | B1 * | 7/2020 | Allen | G06Q 40/08 |
| 11,466,869 | B1 * | 10/2022 | Clark | F24D 19/1063 |
| 11,488,077 | B1 * | 11/2022 | Lyman | H04L 12/2825 |
| 2005/0125102 | A1 * | 6/2005 | Nichols | F24F 11/38<br>700/276 |
| 2005/0248455 | A1 * | 11/2005 | Pope | G04F 10/00<br>374/E1.004 |
| 2008/0011836 | A1 * | 1/2008 | Adema | G06Q 30/00<br>235/383 |
| 2010/0106521 | A1 * | 4/2010 | Ashrafzadeh | G16H 20/60<br>705/28 |
| 2013/0227971 | A1 * | 9/2013 | Tamborra | F25D 29/008<br>62/62 |
| 2014/0006131 | A1 * | 1/2014 | Causey | G06Q 30/0251<br>705/14.24 |
| 2014/0058567 | A1 * | 2/2014 | Matsuoka | G05B 15/02<br>700/276 |
| 2015/0053780 | A1 * | 2/2015 | Nelson | G10L 15/22<br>236/1 C |
| 2015/0186836 | A1 * | 7/2015 | Chouhan | G16H 40/67<br>705/28 |
| 2017/0039885 | A1 * | 2/2017 | Flores | G09B 19/0092 |
| 2017/0102681 | A1 * | 4/2017 | Verhoeven | G05B 15/02 |
| 2017/0219279 | A1 * | 8/2017 | Chae | G01K 1/024 |
| 2017/0234562 | A1 * | 8/2017 | Ribbich | F24F 11/86<br>700/277 |
| 2017/0288401 | A1 * | 10/2017 | Hummon | G05B 15/02 |
| 2018/0032953 | A1 * | 2/2018 | Mayer | G06Q 10/06315 |
| 2018/0073682 | A1 * | 3/2018 | Suman | G08C 17/02 |
| 2018/0315111 | A1 * | 11/2018 | Alvo | G06Q 30/0633 |
| 2019/0078833 | A1 * | 3/2019 | Graziano | H04L 12/2838 |
| 2019/0089193 | A1 * | 3/2019 | Ranjan | G09G 5/14 |
| 2019/0277528 | A1 * | 9/2019 | Malhotra | F24F 11/49 |
| 2019/0353378 | A1 * | 11/2019 | Ramamurti | G05B 15/02 |
| 2019/0387375 | A1 * | 12/2019 | Gao | G06Q 10/087 |
| 2020/0020165 | A1 * | 1/2020 | Tran | G06T 19/003 |
| 2020/0240662 | A1 * | 7/2020 | Picardi | F24F 11/37 |
| 2022/0260987 | A1 * | 8/2022 | Daniels | G05B 23/0283 |

OTHER PUBLICATIONS

Jun, Qiu, et al. "Application of modern communication technology in smart home system." 2018 IEEE International Conference on Information and Automation (ICIA). IEEE, 2018 (Year: 2018).*

Ma, Xiao, Ganna Pogrebna, and Irene Ng. "Smart home, smart things and smart me in the smart city: the hub-of-all-things resource integration and enabling tool (HARRIET)." IET conference on future intelligent Cities. IET, 2014 (Year: 2014).*

Angara, Prashanti, et al. "Foodie fooderson a conversational agent for the smart kitchen." CASCON. vol. 17. 2017 (Year: 2017).*

* cited by examiner

System 1200

ENVIRONMENTAL CONTROL UNIT, VOICE-ENABLED ASSIST DEVICE AND REMOTE SERVER SYSTEM

RELATED APPLICATION

This application is a continuation of a co-pending U.S. patent application Ser. No. 16/221,373, filed 14 Dec. 2018, which is incorporated herein by reference.

TECHNICAL FIELD

Subject matter disclosed herein generally relates to control systems.

BACKGROUND

Various types of devices can be present at a site where individual devices may or may not be connected to a network.

SUMMARY

A system can include an environmental control unit that controls operation of heating, ventilation and air conditioning equipment at a site; a voice-enabled assistant device operatively coupled to the environmental control unit, where the voice-enabled assistant device transmits commands to the environmental control unit and receives time series temperature data from the environmental control unit for temperature at the site; and a remote server operatively coupled to the voice-enabled assistant device, where the remote server receives the time series temperature data from the voice-enabled assistant device and uses a time-dependent model to determine a depletion rate for material at the site based at least in part on the time series temperature data, where the time-dependent model accounts for consumption of the material with respect to time and degradation of the material with respect to time. Various other methods, apparatuses, systems, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing general principles of various implementations. The scope of invention should be ascertained with reference to issued claims.

Figure 1:
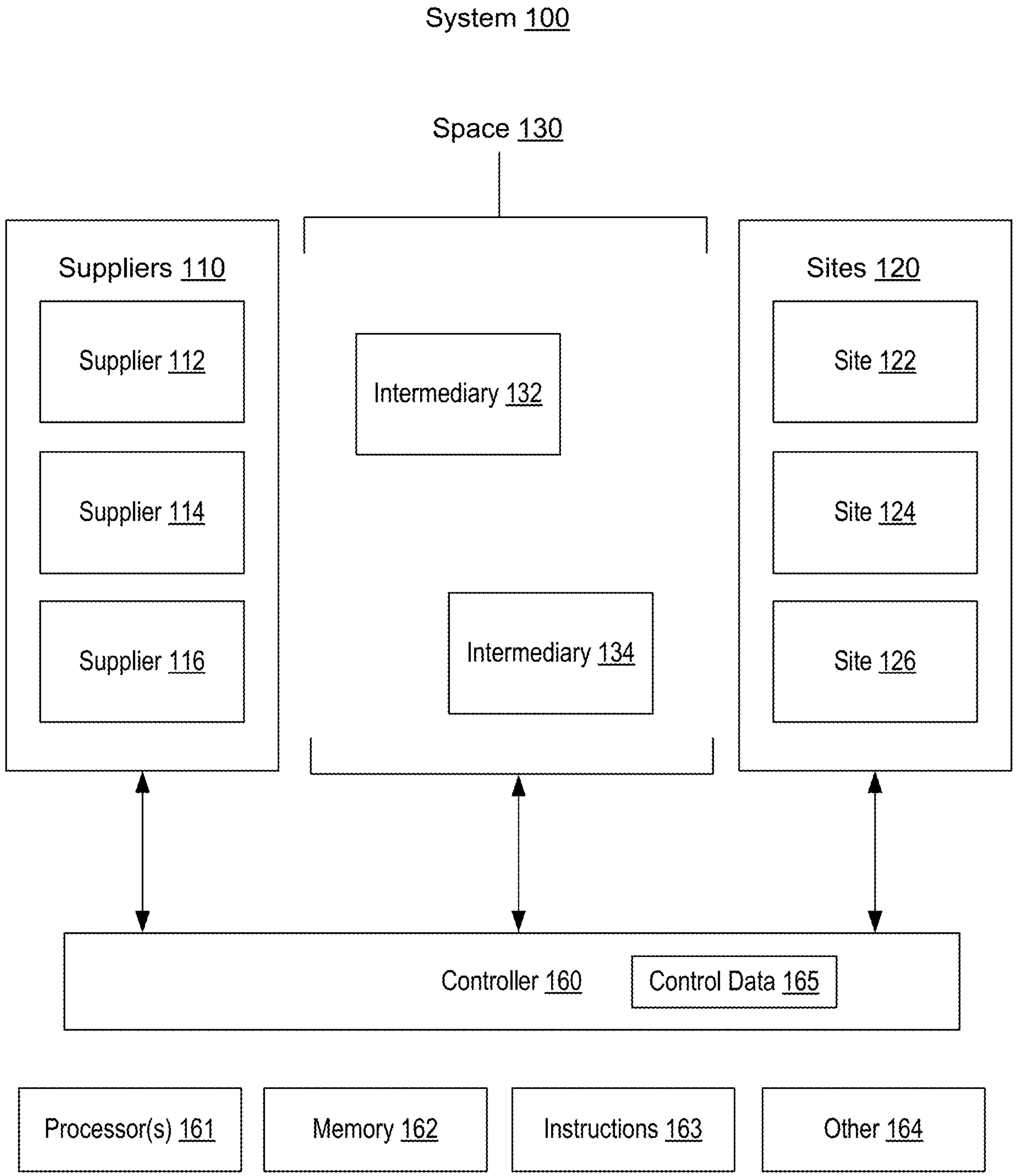
FIG. 1 is a diagram of an example of a system.

FIG. 1 shows an example of a system 100 that includes suppliers 110, sites 120, space 130 and a controller 160, which is a networked controller. In FIG. 1, the lines with arrowheads can represent network connections, which can be wired, wireless or wired and wireless. Various equipment in the system 100 can include network circuitry as associated with network interfaces. As an example, the system 100 can include network interfaces that can operatively connect to the Internet and, for example, a cloud platform.

As shown in FIG. 1, the suppliers 110 can include a supplier 112, a supplier 114, a supplier 116, etc., and the sites 120 can include a site 122, a site 124, a site 126, etc. The suppliers 110 can be associated with physical locations and the sites 120 can be associated with other physical locations, ones that differ from those of the suppliers 110. As the physical locations differ between the suppliers 110 and the sites 120, the space 130 exists, which is a physical space that can be represented, for example, via one or more distances, which may be represented on a geographical map (e.g., as a portion of the Earth). As shown in the example of FIG. 1, one or more intermediaries 132 and 134 can operate within the space 130, for example, to transport goods that originate from one or more of the suppliers 110, for example, to one or more of the sites 120. Modes of transportation can include vehicle transportation (e.g., truck, car, ship, drone, etc.). A vehicle can include circuitry that provides for network connectivity, for example, to allow a vehicle to be in communication, directly or indirectly, with the controller 160 or, for example, one or more other entities, equipment, etc., in the system 100. As an example, a vehicle can be equipped with location circuitry such as, for example, GPS circuitry, WiFi circuitry, etc., which can provide real-time data as to location(s) (e.g., with respect to a map, etc.).

As shown in FIG. 1, the controller 160 can include control data 165. Such data can include data generated by one or more pieces of equipment as associated with one or more of the sites 120 and may include data generated by one or more of the suppliers 110 and/or one or more of the intermediaries 132 and 134 and/or one or more other entities that operates in the space 130 (e.g., or upstream a supplier, etc.). As an example, the controller 160 can be a server-based controller, a site-based controller, a facility-based controller, a mobile device-based controller, or another type of controller.

As an example, a controller can receive data via one or more interfaces, processes the data using one or more processors, and transmit data using one or more interfaces. In such an example, the controller can utilize one or more models, which can be time-dependent models. Such models can include, for example, parameters. As an example, a parameter can be associated with physical activity that occurs with respect to time, which may be, for example, associated with the depletion of material that is transported in a system such as the system 100. As an example, a model can include an initial condition at a particular time (e.g., delivery time) and a depletion rate that depends on various factors that can be determined in real-time or, for example, within an amount of time that may be of the order of days, weeks or months. As an example, where a depletion rate is approximately zero, a model may indicate that material is at or near its initial condition. As an example, a controller can institute control action under such circumstances to assure that additional material is not transported as long as the material is at or near its initial condition, unless, for example, the material is perishable or otherwise indicated to be resupplied, etc. As another example, where a controller receives data that is processed via a model to indicate that a depletion rate of material is greater than a set depletion rate, the controller can institute control action that can call for resupply of material.

As an example, a model of the controller 160 can utilize a relationship that may include a demand term, which can be a demand of a material, such as, for example, the following relationship DM=f(Cb−Cs(t)), where DM may be the material demand for material that can be delivered and present at a site and that is affected (e.g., degraded, depleted, etc.) with respect to time t by one or more factors as may be represented on the right side of the equal sign, for example, a function that depends on a parameter $D_{df}$ that is akin to a "diffusion" coefficient in that it relates a "driving force" to the demand, which changes with respect to time (e.g., $DM=D_{df}(Cb-Cs(t))$). For example, the parameters Cs(t) and Cb can represent the driving force (e.g., "concentration" of the material with respect to time and as delivered, etc.). As an example, where a difference exists between an amount of material remaining at a site and its initial amount (e.g., as in a package), that difference may be a driving force (e.g., Cs being at site and Cb being as delivered, etc.) that prompts a controller to issue an instruction as to a chain of actions for delivery. For example, consider no material at a site at a time t0 and a delivery of material at the site at a time t1 such that Cs(t1)=Cb, which would result in a driving force of zero (e.g., Cb−Cs(t1)=0). In such an example, inferences may be made as to the amount of material at the site at times t2, t3, t4, etc. (e.g., Cs(t2)=0.9*Cb, Cs(t3)=0.7*Cb, Cs(t4)=0.4*Cb). As Cs approaches zero (e.g., 0*Cb), the driving force increases, which means that the demand term DM increases. As Cs(t) is itself a function of time, DM is a function of time and a change in DM over time (e.g., dDM/dt) may indicate an acceleration and/or deceleration in depletion at a site.

As an example, a trigger can be based on a computed demand and/or a change in computed demands with respect to time reaching a certain threshold or thresholds. As an example, an amount of goods at a site can be determined via one or more models (e.g., inferred via generated data that provides indications as to consumption or other types of depletion). As an example, time-dependent model may include various sub-models, which may also be referred to as models. As an example, a model may include a convection term or relationship as to transport of material (e.g., a step-wise convection/transport relationship). Such an approach may account for delivery time, space conditions (e.g., road conditions), weather, etc.

As an example, a relationship may be represented as DM=f(p1, p2, p3, etc.) where f is a function or functions, which may include, for example, one or more trained models (e.g., kernel models, regression models, machine learning models, etc.). As an example, a time-dependent model may be a regression model that includes various parameters. As an example, a relationship can include factors that find analogs in drug-delivery models. For example, the aforementioned relationship can be a form of the Noyes-Whitney model, which, as an example, may be applied to a system such as the system 100. In such an example, a delivery can be akin to a dosage of a material that is delivered to a patient where the material is soluble via chemical diffusion with respect to time and, for example, metabolized (e.g., according to chemical reaction, biological half-life, etc.) with respect to time. As to half-life, biological half-life of a biological material is the time it takes for half to be removed by biological processes when the rate of removal is roughly exponential (e.g., consider $t_{1/2}$). Such a half-life can be derived from a first-order rate (e.g., dM/dt=kM, which may be represented as $M(t)=M(0)e^{-kt}$ where M represents material. As an example, a time-dependent model can include one or more relationships that can determine a half-life of material, which may vary with respect to time, for example, as indicated by acquisition of one or more types of data (e.g., an adjustable half-life). Such a half-life may be utilized, alone and/or in combination with one or more other parts of a model, to predict (e.g., estimate) a time that can be compared to a pre-determined time (e.g., a scheduled time) to determine, for example, whether one or more control actions are to be taken, called for, etc. Where a half-life is adjustable in response to real-time data (e.g., directly and/or indirectly), a resulting "curve" of depletion may be other than exponential (e.g., consider a phasic curve that may include multiple phases, etc.).

As an example, a system such as the system 100 can consider physical characteristics of material itself (e.g., perishable, shelf-life, decay, efficacy, storage conditions such as temperature and/or humidity, etc.) and actions taken with respect to the material, for example, as to its intended purpose (e.g., consumption, usage, etc.). Referring again to the Noyes-Whitney model as an example, consider use of a relationship that is part of a time-dependent model that accounts for material itself (e.g., Csm(t)) and another relationship that is part of the time-dependent model that accounts for action related depletion (Csa(t)). As example, each part may utilize an adjustable half-life type of model that is adjusted in response to data. For example, a dynamic half-life relationship may characterize material itself (e.g., without deliberate action) and another dynamic half-life relationship may characterize depletion via action taken (e.g., consider DM=f((Cb−Csm(t)−Csa(t)). As an example, those two parts may vary over time as to contribution to determination of an appropriate resupply time (e.g., resetting Cs(t) to Cb, etc.). For example, if material has a shelf-life that is two months, if that material is not consumed (e.g., depleted via human action, machine action, etc.) in two months, the material itself part can primarily account for determining a resupply time; whereas, if the material is consumed within one month, then the action part can primarily account for determining a resupply time.

As an example, a time-dependent model can be utilized by a controller, for example, to determine one or more of a delivery amount of material and a delivery time of material. In such an example, the controller can issue one or more instructions (e.g., commands, etc.) that call for action within a system such that a process occurs that includes packaging and transporting material for purposes of delivery of the material.

As shown in FIG. 1, as an example, the controller 160 can include a processor 161; memory 162 accessible to the processor 161; processor-executable instructions 163 stored in the memory and executable by the processor 161 to instruct the system to: receive data that include data generated by circuitry at one of the sites 120 and data generated by mobile device circuitry of a mobile device that is associated with one of the sites 120; process the data according to a time-dependent model associated with the one of the sites 120 to generate a time; compare the time to a predetermined time; and control issuance of an instruction based at least in part on the comparison where the instruction controls a packaging process of a package as associated with at least one of the suppliers 110 that includes indicia associated with the one of the sites 120. In such an approach, the package includes material or materials, which may be referred to as goods. As an example, indicia may include one or more of name, street address, city, state, country, postal code, etc.

As an example, data generated by circuitry at a site can be generated via circuitry such as, for example, a modem, a router, an appliance, a voice-enabled assistant device (VEA), etc. As an example, data generated by mobile device circuitry of a mobile device can be generated via circuitry such as that of an individual's mobile phone, smartwatch, fitness tracker, vehicle, bicycle, etc.

As an example, a time-dependent model can be a time-dependent parametric model associated with a site that can generate a time, which can be a predicted time. For example, consider a time-dependent parametric model that is based on/includes a subscription model, which may be for goods provided by one or more suppliers. Various types of parameters can be included in such a model (e.g., associated with a site, associated with an individual or individuals, associated with goods, etc.). As an example, a time-dependent model can be or can include a kernel model, a machine learning model, etc. As mentioned, a time-dependent model can include one or more biological and/or chemical model analogs (e.g., half-life, Noyes-Whitney, diffusion, reaction, convection, etc.). As an example, a time-dependent model can be learned using data that is generated via one or more pieces of equipment. As an example, a time-dependent model may model actions, behaviors, consumption of goods, locations, etc. As an example, a time-dependent model can be based at least in part on time series data as may be generated by one or more pieces of equipment that may be associated with a site. As an example, a time-dependent model can be a prediction model that can be utilized to predict one or more times as associated with material or materials.

As an example, a comparison can be of a time that is a predicted time (e.g., per a prediction model) to a predetermined time that is a scheduled time of a subscription model. A subscription model can specify a schedule (e.g., a frequency, etc.) for delivery of a quantity of goods (e.g., packaged goods) to a site. Such a schedule can be a fixed schedule where, for example, an interval between deliveries is fixed as a time interval (e.g., every X days, every Y weeks, every Z months, etc.). For example, in FIG. 1, each of the sites 120 can have one or more subscriptions with corresponding subscription models that relate to one or more of the suppliers 110 for delivery of packaged goods.

As an example, as to control of issuance of an instruction based at least in part on a comparison, the instruction can be for control a packaging process of a package that includes indicia associated with a site. For example, consider issuance of an instruction that triggers a chain of actions. As an example, an instruction can control, directly or indirectly, a process to have goods packaged and transported to a site address, as may be part of the indicia (e.g., a home address, etc.).

As an example, the controller 160 can include circuitry and a network interface that receives data generated by a mobile device. As an example, the controller 160 may be embedded in a VEA, a router, a modem, etc.

As an example, the controller 160 can be a server or be embedded in a server (e.g., consider a cloud-based server, etc.).

As an example, the controller 160 can include instructions that access a schedule that includes at least one predetermined time, which may be part of a subscription model.

As an example, the controller 160 can receive data generated by circuitry of one or more mobile devices where such data include geolocation data. As an example, the controller 160 can include instructions to process the data where the instructions associate the geolocation data with a first type of facility that is remote from the site and where, for the first type of facility, the time-dependent model generates a time that is less than the predetermined time. For example, consider a first type of facility that is a "use" facility that accelerates "use" of goods (e.g., consider a gym that indicates an accelerated use of protein powder). Additionally or alternatively, the controller 160 can include instructions to process the data where the instructions associate the geolocation data with a second type of facility that is remote from the site and where, for the second type of facility, the time-dependent model generates a time that is greater than the predetermined time. For example, consider a second type of facility that is a "non-use" facility that decelerates "use" of goods (e.g., consider a workplace/office where work may be at a desk or other sedentary position that would indicate a decelerated use of protein powder).

As an example, data generated by circuitry at a site can include, for example, one or more types of power usage data (e.g., oven, fireplace, water heater, refrigerator, wash machine, electric razor, vacuum cleaner, etc.). As an example, instructions to process data can include instructions that compare power usage data to a usage model to determine a usage indicator where, for an overusage indicator, a time-dependent model generates a time that is less than a predetermined time and/or instructions to process data can include instructions that compare power usage data to a usage model to determine a usage indicator where, for an underusage indicator, a time-dependent model generates a time that is greater than a predetermined time. As an example, power usage data can include one or more of electrical power usage data and gas power usage data. As mentioned, a time-dependent model may account for conditions such as, for example, temperature and/or humidity. In such an example, where goods are sensitive to temperature and/or humidity, data generated regarding temperature and/or humidity (e.g., via sensors) can be utilized with respect to a part of a time-dependent model that accounts for goods themselves (e.g., degrade at higher temperature and higher humidity) and/or with respect to a part of a time-dependent model that accounts for usage (e.g., high temperature is an indicator of increased consumption, low humidity is an indicator of decreased consumption, etc.).

As an example, instructions can include instructions that, based on at least a portion of data, are executable by a processor or processors to determine an occupancy schedule for a site. For example, consider data generated by mobile device circuitry of a mobile device that include data generated by wearable mobile device circuitry of a wearable mobile device. As another example, consider data generated by circuitry at a site that include site security data, which can indicate occupancy (e.g., time-series data as to motion, door usage, etc.). As an example, site security data can include object detection data. As an example, data generated by circuitry at a site can include site environmental control data. As an example, instructions of a controller to control issuance of an instruction based at least in part on a comparison may control issuance based at least in part on an occupancy schedule for a site, which may be determined via analysis of generated data.

As an example, a method can include receiving data that include data generated by circuitry at a site and data generated by mobile device circuitry of a mobile device; processing the data according to a time-dependent model associated with the site to generate a time; comparing the time to a predetermined time; and controlling issuance of an instruction based at least in part on the comparing where the instruction controls a packaging process of a package that includes indicia associated with the site.

Various types of subscription models for goods allow users to maintain inventory of consumable items without having to regularly remember to place an order manually. However, such subscription models can suffer from a lack of forecasting and relation of product consumption to re-ordering. Such issues can result in, for example: 1) Re-ordering a consumable too early and having too much inventory; or 2) Re-ordering a consumable too late and having a gap in inventory. In various scenarios without dynamic control (e.g., strict pre-determined schedule), seldom is ordering to consumption timed perfectly. As explained, the system 100 of FIG. 1 can include various features that can dynamically adjust a subscription model via adjustment to control data. Such an approach can include predictively determining consumption of a product and re-ordering that product by leveraging a user's "Internet of Things" (IoT) network and trend analysis. Such an approach, as mentioned, can include determining aspects of a product (e.g., material) itself, which, at times may dominate over human and/or machine actions that are consumptive. As an example, a consumption model can account for aspects of a product itself. For example, a consumption model can include a degradation model that accounts for how a product may degrade by itself with respect to time (e.g., as may be indicated by a use by date, a shelf-life, etc.).

As an example, a system may optionally consider the consumptive nature of one or more IoT devices (e.g., machines). As explained, a system can consider factors such as digital shopping (e.g., transactions data), seasonality (e.g., weather, etc.) and geolocation of a user (e.g., via one or more site devices and/or one or more mobile devices) to create a consumption model, which may be a time-dependent model for purposes of making adjustment(s) to control data.

As an example, a system can include features to dynamically adjust a subscription based model for goods based on user trends. Such a system can relate user trends to consumption of such goods, which may include, for example, determining whether or not the user still needs such goods.

As an example, a system can provide for establishing an IoT mesh network with surrounding devices within a physical space specific to a user and acquiring and/or generating data using the IoT networked devices (e.g., which may be stored locally and/or remotely in a library). Such a system can acquire and/or generate data response to user interaction and/or non-interaction with one or more IoT devices.

As an example, a system can include storage for storing subscription models. As an example, a system can generate a time-dependent model that utilized IoT device data and/or metadata, which may strengthen the time-dependent model with respect to its ability to make predictions as to goods associated with one or more subscription models. As an example, a system may access one or more types of data and/or generate one or more types of data (e.g., calendar entry data, seasonality data, geolocation data, etc.). As an example, a system can transmit one or more instructions (e.g., commands, triggers, etc.) to one or more entities (e.g., supplier, fulfillment center, etc.) to execute an order (e.g., a chain of actions that results in delivery of goods). Such a system can improve order accuracy, inventory levels and user experience.

As to some example of goods and data, consider protein powder and gym related data, which can include business travel data, remote gym data, home occupancy data, local gym data, etc. As an example, gym data can include gym "check-in" data such as, for example, data generated via the MINDBODY platform offered by MINDBODY, Inc. Such a platform allows a user to check-in, schedule classes, track payments, usage, etc. As an example, a system can include features to access the MINDBODY platform or other gym-related platform as to historical data, real-time data, future scheduled data, etc. As an example, a system can analyze such data to determine future schedule versus past attendance, which may correspond to a type of behavior of an individual (e.g., does the individual actually go to scheduled class sessions, etc.). Such data can be utilized in generating a time-dependent model as to the individual's usage of goods such as, for example, protein powder.

As another example, consider golf balls and/or tennis balls as types of activity equipment. In such an example, a system may access one or more of calendar entries, geolocation, digitally entered golf scores, etc. As an example, a golf course (e.g., or golf club) may maintain digital records that are generated and accessible to a system for purposes of training a time-dependent model.

As an example of food, consider tortilla chips which may be on a digital subscription model list. As an example, transaction data of an individual as indicated via a mobile device pay technology, a debit card or credit card technology, etc., may be access to determine whether the individual has acted in a manner that impacts a subscription model. For example, an individual may have a subscription model for delivery of tortilla chips and transaction data may indicate that the individual purchased tortilla chips (e.g., or a substitute such as potato chips). In such an example, the transaction data may be accessed and utilized in conjunction with a time-dependent model to determine whether control data is to be adjusted. As an example, a system can include generating a message and communicating the message to a user, optionally via a graphical user interface (GUI). In such an example, the message may say, "you just bought chips, adjust subscription model for chips?" Where a user interacts with the GUI to provide an answer, a system can adjust (e.g., "yes") or not adjust ("no") the subscription model. Where the system has access to a calendar with, for example, an entry that states "house warming party", the system may determine that the user does not want to adjust the subscription model and thereby forego messaging the user. As an example, certain goods may be seasonal, where a system may adjust control data based on season (e.g., optionally weather, etc.). For example, consider popsicles and hot cocoa being associated with two different seasons.

As an example, the system 100 of FIG. 1 may leverage an existing IoT mesh network of a site where devices communicate wirelessly and share information with each other centralized to a user or space.

As an example, the system 100 of FIG. 1 may operate in accordance with instructions that aim to comply with regulation. For example, consider the right to be forgotten where data controllers are to erase personal data without undue delay in certain circumstances, when so requested and/or the right to data portability where individuals that have provided personal data to a service provider can require the provider to "port" the data to another provider. As another example, consider the right to object to profiling where a customer can object to being subject to a decision based solely on automated processing.

As an example, the system 100 of FIG. 1 may operate in accordance with instructions that aim to provide for unsubscribing from a subscription model for goods. For example, various state laws in the United States provide that a supplier or other entity that handles subscription models facilitate unsubscribing therefrom, which can include unsubscribing via a website, email, etc. As an example, a time-dependent model can be data-based and determine that a subscription should end. In such an example, the system may automatically access a website, send an email, etc. to facilitate termination of the subscription. As an example, such an approach may include messaging a user, optionally via a GUI, to allow a user to make a final decision (e.g., via input through a touch screen, a voice command, a gesture, etc.).

Figure 2:
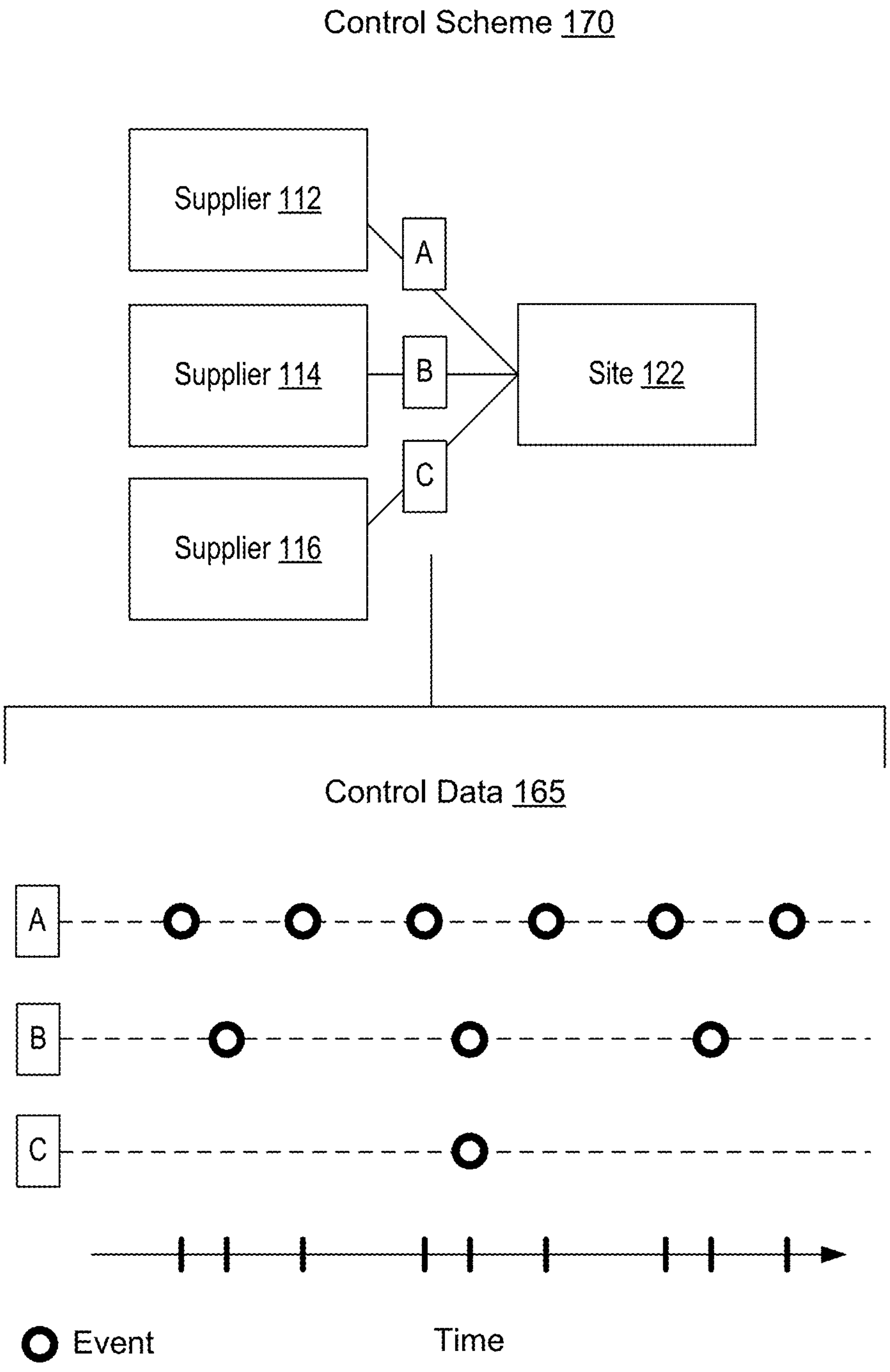
FIG. 2 is a diagram of an example of a control scheme.

FIG. 2 shows an example of a control scheme 170 that may be implemented in the system 100 of FIG. 1. As shown in the example of FIG. 2, the supplier 112 can include a subscription model A associated with the site 122, the supplier 114 can include a subscription model B associated with the site 122, and the supplier 116 can include a subscription model C associated with the site 122. The subscription models A, B and C can be, for example, represented with respect to a timeline as control data 165, which includes various events represented by open circles. The events can correspond to delivery events or other events in a chain of actions where the end of the chain results in delivery of goods (e.g., packaged goods) to the site 122 as supplied by a respective one of the suppliers 112, 114 and 116. As shown, the control data 165 for the different subscription models A, B and C include events at different frequencies, some greater, some lesser (e.g., frequency of A>B>C). Such control data may be "base-state" control data in that it is fixed and not automatically adjusted. As explained, the system 100 can provide for automatic adjustment of control data such that control data can differ from that of a base-state, which may be an initial state, for example, based on an individual's estimated needs/usage of goods.

As an example, a method can include generating a time-dependent model in advance of entering into a subscription model such that the subscription model, in its initial state, is based at least in part on estimates provided by the time-dependent model. For example, the system 100 may operate in a manner that acquires and processes data generated prior to issuance of control instructions that cause one or more of the suppliers 110 to perform one or more actions. Or, for example, the system 100 can learn from one or more site/supplier interactions and utilize that learning to estimate control data (e.g., an initial state) for a site that enters into a subscription model with one or more of the suppliers 110. In such an example, the system 100 can determine what pre-existing knowledge as to site/supplier interaction is likely to match that of the new site/supplier interaction and then generate an initial state of control data that is amenable to adjustment after site/supplier interactions commence.

Figure 3:
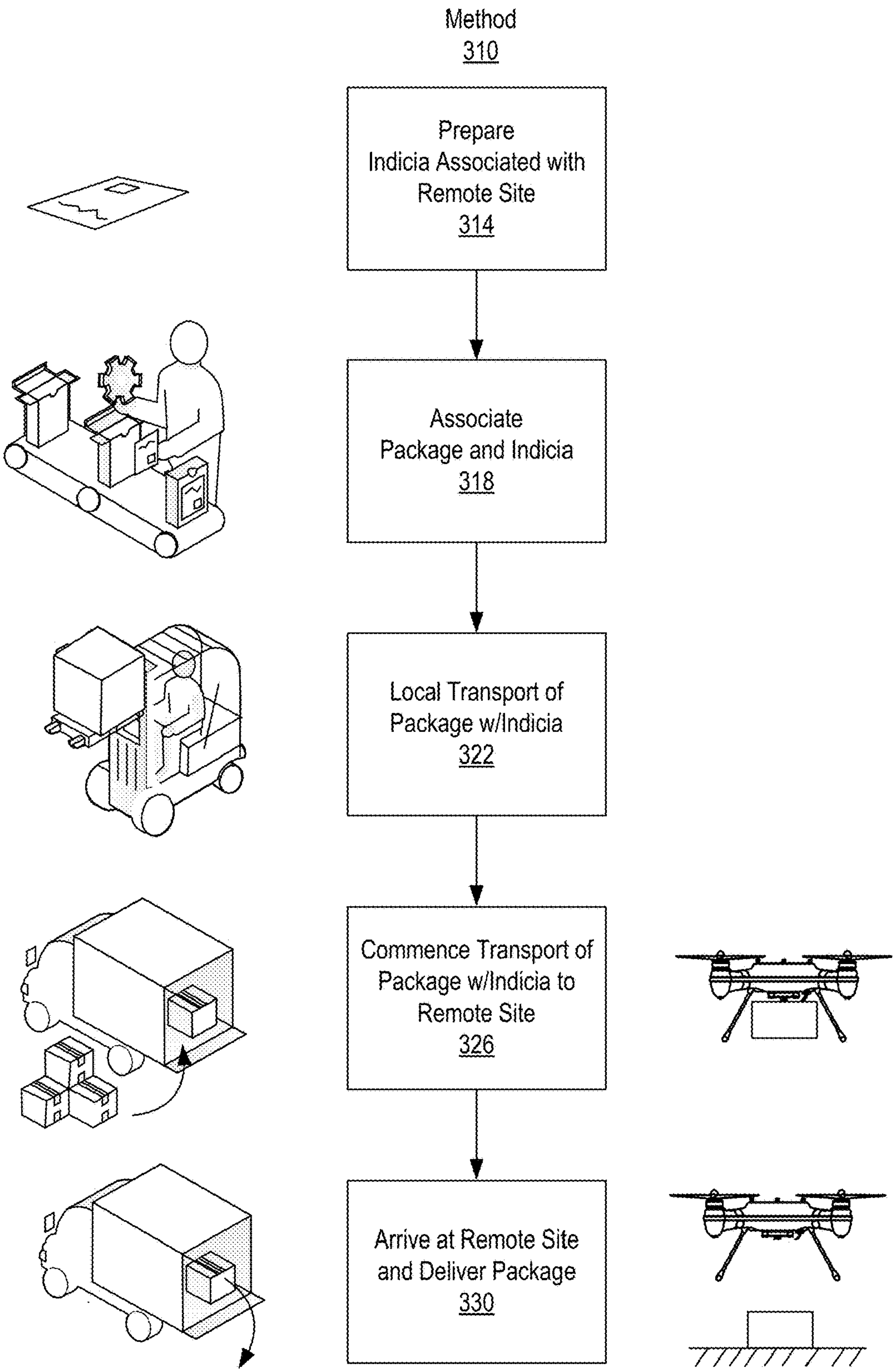
FIG. 3 is a diagram of an example of a method and examples of equipment.

Various types of site/supplier interactions can occur. To provide context, consider FIG. 3, which shows an example of a method 310 that includes site/supplier interaction that can be under the control of control data. As shown in FIG. 3, the method 310 includes a preparation block 314 for preparing indicia associated with a remote site, an association block 318 for associating a package with the indicia, a local transport block 322 for locally transporting the package with the indicia, a commencement block 326 for commencing transport of the package with the indicia to the remote site, and an arrival block 330 for arriving of the package with the indicia at the remote site.

The method 310 can be implemented using one or more systems. For example, the preparation block 314 can include utilizing a networked printer that receives data responsive to an event, which can be a control data event, where the networked printer prints a label (e.g., directly on a package or on paper, etc., which may be associated with a package). For example, a computing system can access control data that includes a schedule of events where an event can be for one or more times that can provide for a delivery time of the arrival block 330. For example, if the arrival block 330 is programmed to provide for arrival on Wednesday afternoon, the preparation block 314 can be operational at a prior time that can account for one or more timings (e.g., estimated timings) of actions of one or more of the blocks 318, 322, 326 and 330 such that the delivery time of the arrival block 330 is met (e.g., with a certain likelihood or probability). As an example, the preparation block 314 may include preparing with electronic indicia (e.g., an RFID chip, other digitally stored indicia, etc.). As an example, digital indicia may be readable by equipment of a vehicle (e.g., truck, drone, etc.) or carried by a vehicle.

As an example, control data such as the control data 165 can provide for a delivery time window, which may be in advance of a supply need. For example, if a package includes protein powder that is to replenish a supply at a remote site where that supply is expected to be wholly consumed by the Monday, the Wednesday afternoon timing may be specified to have a "by Saturday afternoon at the latest" limit. Such a limit (e.g., delivery window) can depend on one or more factors such as, for example, the type of goods, which may be perishable, non-perishable, pharmaceutical, size of goods, etc. A system may aim to deliver a package of goods to replenish the goods at a remote site before the goods at the remote site are wholly consumed. As an example, a remote site that is limited as to storage (e.g., a trailer, a "tiny" house, an apartment, a boat, etc.), the timing of delivery may take into account the amount of storage at the remote site. In such an example, deliveries may be more frequent such that smaller quantities of goods are packaged and transported to account for limited storage. As an example, one or more types of site-based devices (e.g., or mobile devices) may generate data as to storage capabilities. Or, for example, a system may access one or more databases that can provide an indication as to how much space may be available (e.g., a tax records data base as to size, a real-estate data base, etc.).

As shown in FIG. 3, delivery to a remote site may be via a vehicle such as a road vehicle (e.g., a truck, etc.) or, for example, an unmanned vehicle such as a drone. As an example, carrying capacity, distance, weather, etc., may be taken into account as to amount of goods, timing of one or more actions, frequency of delivery, etc. As an example, a delivery scheme may include one or more modes of transportation and/or one or more transitions, for example, between types of vehicles, countries, etc. As an example, for goods that are to be transported internationally (e.g., cross-border), timings may account for procedures associated with customs, border crossings, etc.

Referring again to FIG. 3, various graphics represent examples of goods, packaging, equipment, etc. For example, a supplier can include one or more conveyor systems, one or more lifts, people, etc. As an example, equipment may include RFID and/or other computerized tracking equipment (e.g., cameras, scales, etc.). As an example, a process can include one or more quality control stations, which may implement, for example, non-destructive testing, etc. (e.g., via cameras, scales, energy waves, etc.).

As an example, where a package is to be transported via a drone (e.g., an unmanned vehicle), one or more security measures may be implemented, which can include, for example, non-destructive test (e.g., x-ray scanner, chemical scanner, etc.).

As an example, where multiple different types of goods can be packaged in a common package, synchronization may be implemented. For example, as mentioned, control data may include a metric that provides for some amount of flexibility in delivery time. Where two different types of goods overlap within their flexibility windows, the goods may optionally be synchronized or consolidated into a common package.

Again, FIG. 3 provides some examples of actions that may occur for a supplier and a site that have a subscription model and corresponding control data (e.g., a schedule, etc.). As explained with respect to the system 100 of FIG. 1, such control data can be adjusted using generated data. As an example, such a system 100 can provide a site with a more appropriate amount of goods (e.g., packaged goods). Such a system 100 can make static control data dynamic in that control data can be adjusted using time series data. As such, a control scheme can utilize feedback, which can be direct and/or indirect as to demands, needs, etc., as associated with goods.

Figure 4:
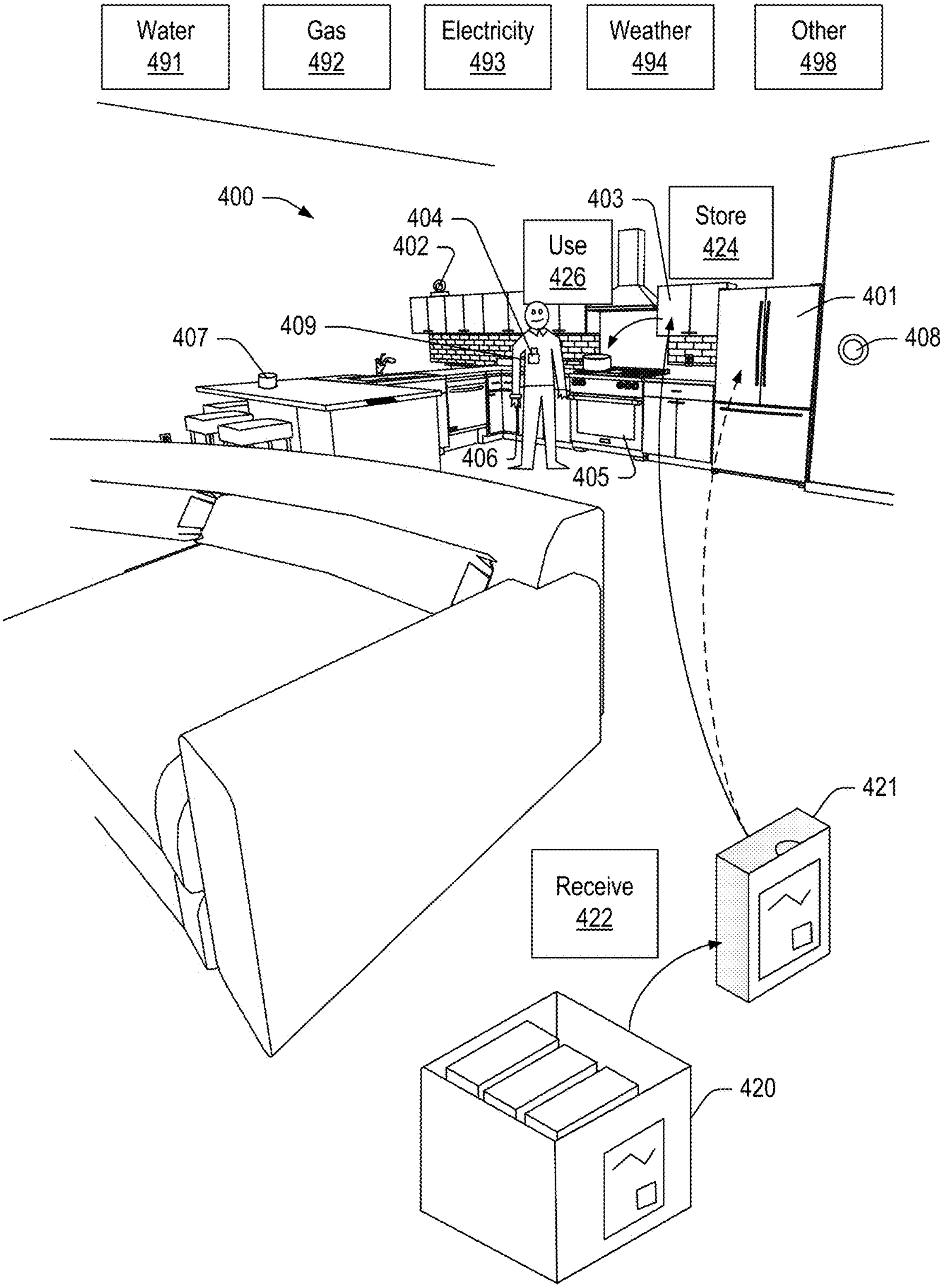
FIG. 4 is a diagram of an example of a site.

As to an example of a site, such as one or more of the sites 120 of the system 100 of FIG. 1, consider FIG. 4, which shows an example of a portion of a type of site 400 that includes various equipment such as, for example, a refrigerator/freezer 401, a security camera 402, a storage cabinet 403, a mobile phone 404, an oven/cooktop 405 (e.g., electric, gas, gas/electric), a wearable device 406, a hub device 407 (e.g., a voice-enabled assistant (VEA), a router, a hot-spot, etc.) and a thermostat 408 (e.g., environment control unit), etc. In the site 400, one or more pieces of equipment can include network circuitry that can establish a network link or links to one or more networks. For example, consider a cellular network link to a cellular network, a cable network link to a cable network, a satellite network link to a satellite network, a telephone landline network link to a telephone landline, etc. In such examples, a link may be established for communicating data. As an example, data may be received and/or transmitted via a link. As an example, a link can be a link to the Internet or another type of network, which may be public or private. As an example, a link can be a secure link in that data are encrypted. As an example, virtual private network (VPN) technology may be implemented to establish a link to a network and to communicate via that network in a relatively secure manner. As an example, a link can include data as to location, which may be location data as to one or more pieces of equipment at the site 400 (e.g., MAC data, IP address data, etc.). As an example, a link can be established in a manner where data may be limited as to identity of equipment, location, etc. (e.g., consider browsing via a VPN service, etc.).

As shown, a box 420 can be received 422 where the box 422 includes a number of packages where one of the packages 421 may be removed from the box 420 and stored 424 in the refrigerator/freezer 401 or the storage cabinet 403. The contents of the package 421 (e.g., goods) can be used 426, for example, for consumption by one or more people (e.g., or other animals such as dogs, cats, fish, or other pets, or livestock, etc.), etc.

As shown, the site 400 can include equipment that can monitor supply of water 491, supply of gas 492, supply of electricity 493, weather 494 and/or other commodities, conditions, etc. For example, consider monitoring of water utilized by a sink, a refrigerator (e.g., cold water), a freezer (e.g., ice cube maker), an oven (e.g., a steam oven), a dishwasher, etc. As an example, monitoring of gas can be for one or more appliances (e.g., a water heater, a stove, an oven, a fireplace, a grill, a clothes dryer, etc.). As an example, monitoring of electricity can be for one or more appliances, lights, etc. (e.g., a refrigerator/freezer, a stove, an oven, a range hood, a water heater, a garage door opener, a dishwasher, a clothes washer, a clothes dryer, an electric vehicle charger, solar panels, a water turbine, a wind turbine, etc.). As to weather, one or more pieces of equipment can monitor weather conditions and/or access one or more sources of weather information (e.g., radio, network, etc.). As an example, the thermostat 408 may be controllable using one or more types of data. Various equipment can be operable manually and/or operable automatically. The thermostat 408 may be operable manually, for example, via a touch screen of the thermostat and/or other type of user interface and/or via an application executable via a computing device such as a laptop computer, a desktop computer, a tablet, a smartphone, a voice-enabled assistant (VEA), etc. As an example, the site 400 can be a "smart" site such as, for example, a smart home.

FIG. 4 shows an individual 409, which can be assigned a status via one or more pieces of equipment. For example, a status can be present at the site 400 or not present at the site 400. As an example, a status may be assigned to the individual 409 such as moving, still, standing, in room X, in room Y, in room Z, entering, leaving, operating equipment X, equipment Y, equipment Z, etc.

As an example, the mobile phone 404 can include a processor, memory and instructions executable by the processor to cause the mobile phone 404 to generate data about the individual 409 when carried by the individual 409 and/or when not carried by the individual 409. As an example, the mobile phone 404 can include one or more sensors that generate sensor data (e.g., motion, temperature, location, app executing, app not executing, voice stress, on-the-phone, off-the-phone, airplane mode, not airplane mode, texting, not texting, online browsing, not online browsing, emailing, not emailing, etc.). As an example, the mobile phone 404 can generate time series data germane to status of the individual 404. As an example, the mobile phone 404 can include one or more interfaces, which may be wired and/or wireless interfaces. As an example, the mobile phone 404 may be a smartphone. As an example, the mobile phone 404 can be in communication with one or more pieces of equipment at the site 400 and/or at a facility that is remote from the site 400. The mobile phone 404 can include one or more SIM cards, cellular circuitry, etc., for example, as may be present in a mobile phone that operates using the APPLE iOS operating system (e.g., consider an iPhone smartphone), the GOOGLE ANDROID operating system (e.g., consider a MOTO smartphone), etc. As explained, the mobile phone 404 can provide data as to the status of the individual 409.

As an example, the wearable 406 can include a processor, memory and instructions executable by the processor to cause the wearable 406 to generate data about the individual 409 when worn by the individual 409 and/or when not worn by the individual 409. As an example, the wearable 406 can include one or more sensors that generate sensor data (e.g., heart rate, motion, temperature, activity, altitude, location, etc.). As an example, the wearable 406 can be a fitness wearable (e.g., a FITBIT wearable) that can determine activity type, duration, etc., using one or more sensors. For example, if the individual 409 is at a facility such as a gym and exercising on a treadmill, the wearable 406 can generate activity data that indicates the individual 409 is on a treadmill, which may include time series data such as heart rate versus time, body temperature versus time, motion versus time, etc. As an example, the wearable 406 can include one or more interfaces, which may be wired and/or wireless interfaces. As an example, the wearable 406 may be a smartwatch (e.g., an APPLE smartwatch, a MOTO smartwatch, etc.). As an example, the wearable 406 can be in communication with one or more pieces of equipment at the site 400 and/or at a facility that is remote from the site 400. As explained, the wearable 406 can provide data as to the status of the individual 409. As explained, status of an individual (or individuals) may be utilized to estimate an amount of goods that remains at a site and/or a rate of consumption or depletion of goods (e.g., whether used at the site or remote from the site).

As an example, one or more pieces of equipment of FIG. 4 can generate data germane to status of the individual 409, which can include direct activity of the individual with respect to the box 420, the package 421, contents of the package 421, etc. For example, the wearable 406 may generate data as to opening a door of the storage cabinet 403 and/or a door of the refrigerator/freezer 401. As an example, the wearable 406 can include RFID and/or other type of circuitry that can read a corresponding RFID chip and/or other type of identification circuitry. In such an example, the box 420, the package 421, the storage cabinet 403, the refrigerator/freezer 401, etc., may include identification circuitry such that data is generated by the wearable 406 as to one or more of multiple different items. For example, if the individual 409 picks up the package 421 and brings it into proximity to the refrigerator/freezer 401, the wearable 406 can identify the package 421 and the refrigerator/freezer 401 and associate the two in a manner that logically indicates that the package 421 and/or contents thereof are being placed into the refrigerator/freezer 401. As may be appreciated, such an approach can include generating data that indicates that the individual 409 is taking the package 421 out of the refrigerator/freezer 401. As an example, a package may include a sensor chip with memory that can store, for example, temperature history of the package. As mentioned, such data can be utilized in assessing material in the package (e.g., whether it is still good for use, when it will no longer be suitable for use, etc.), which may depend on storage at a site (e.g., temperature at the site as may be determined via one or more pieces of equipment in an IoT mesh, etc.).

As mentioned, the site 400 can include one or more security devices such as, for example, the security camera 402, which may generate data as to the status of the individual 409 and/or one or more other items (e.g., the box 420, the package 421, etc.).

As explained, various types of data can be generated at the site 400 using various types of equipment and, for example, equipment such as the mobile phone 404 and/or the wearable 406 can generate various types of data concerning the individual 404 at the site 400 and/or at one or more remote facilities (e.g., gym, doctor, airport, etc.). As may be appreciated, while the example of FIG. 4 shows the individual 409, a site can have from time to time more than one individual, which may possess one or more mobile phones, wearables, etc. In the example of FIG. 4, data may be generated for a plurality of individual and/or a plurality of items (e.g., boxes, packages, etc.).

As explained, a site such as the site 400 can be highly instrumented with various types of equipment that can generate various types of data, which may, for example, be utilized in a system such as the system 100 of FIG. 1.

Figure 5:
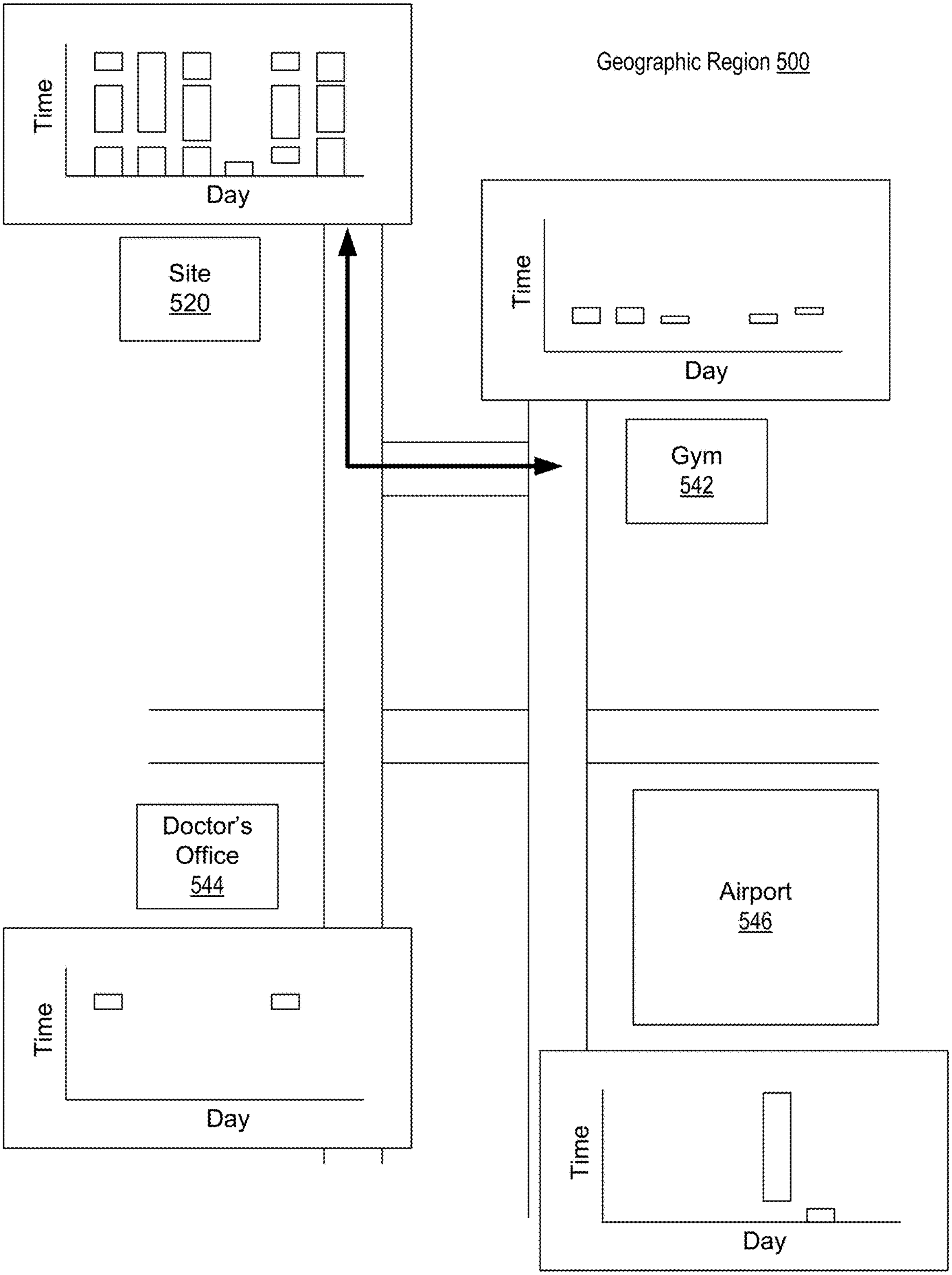
FIG. 5 is a diagram of an example of a geographic region.

FIG. 5 shows a graphical view of a geographic region 500 that includes a site 520 and a plurality of facilities that include a gym 542, a doctor's office 544 and an airport 546 as some examples of facilities that are remote from the site 520. At each of the locations, data are shown as time of day versus day (e.g., day of the week, month, year, etc.). Such data can be for an individual such as, for example, the individual 409 of FIG. 4 where the site 520 may be the site 400.

As mentioned, various types of equipment can generate data as to status of an individual (e.g., or individuals, which may, for example, utilize a common supply of goods, etc.). Such data can include the data of one or more of the graphics (e.g., plots) of FIG. 5. As shown in FIG. 5, the individual is primarily at the site 520 over the span of days; noting that on the fourth day, the data indicate that the individual is absent from the site 520 and is located at the airport 546. The data associated with the airport 546 as a facility indicates a status that spans approximately a day, part of the fourth day and part of the fifth day. As an example, a remote location of travel may be indicated or merely that the individual is/was at the airport 546 as a last location of the geographic region 500 that includes the site 520, which may be representative of the "habits" and "behavior" of the individual, particularly as to what types of packages may be received at the site 520.

As shown in FIG. 5, the individual is/was present at the gym 542 at approximately the same time for five of the seven days and is/was present at the doctor's office 544 at approximately the same time for two of the days. As an example, a route of travel may be indicated via data generated by a device (e.g., a wearable, a mobile phone, a vehicle, a bicycle, etc.). Such travel route or path data can be utilized as an indication of possible other facilities that may have been visited. While the data shown in FIG. 5 includes historical data, as may be appreciated, such data can include real-time data. Real-time data can be, for example, streamed in substantially real-time as it is generated (e.g., location GPS data, batches of sensor, which may vary in size, etc.). For example, a device can include GPS circuitry, WiFi circuitry, cellular circuitry, etc., that is transmitted in real-time (e.g., via pinging, etc.) and/or that can be accessed in substantially real-time to ascertain location and/or one or more other factors associated with an individual. As another example, a wearable or mobile phone may include a buffer that fills with sensor data and that once full transmits the sensor data via one or more network connections. As an example, a vehicle can include one or more types of circuitry that can generate location data and/or other data. For example, consider a vehicle equipped with cellular circuitry that can transmit various types of data concerning vehicle location, operation, etc.

In the example of FIG. 5, the data associated with one or more of the remote facilities can include geolocation data. Such data can be utilized directly and/or indirectly by a controller such as the controller 160 of FIG. 1. For example, consider such data being utilized to estimate one or more of a consumption rate, an occupancy schedule at a site, etc.

Figure 6:
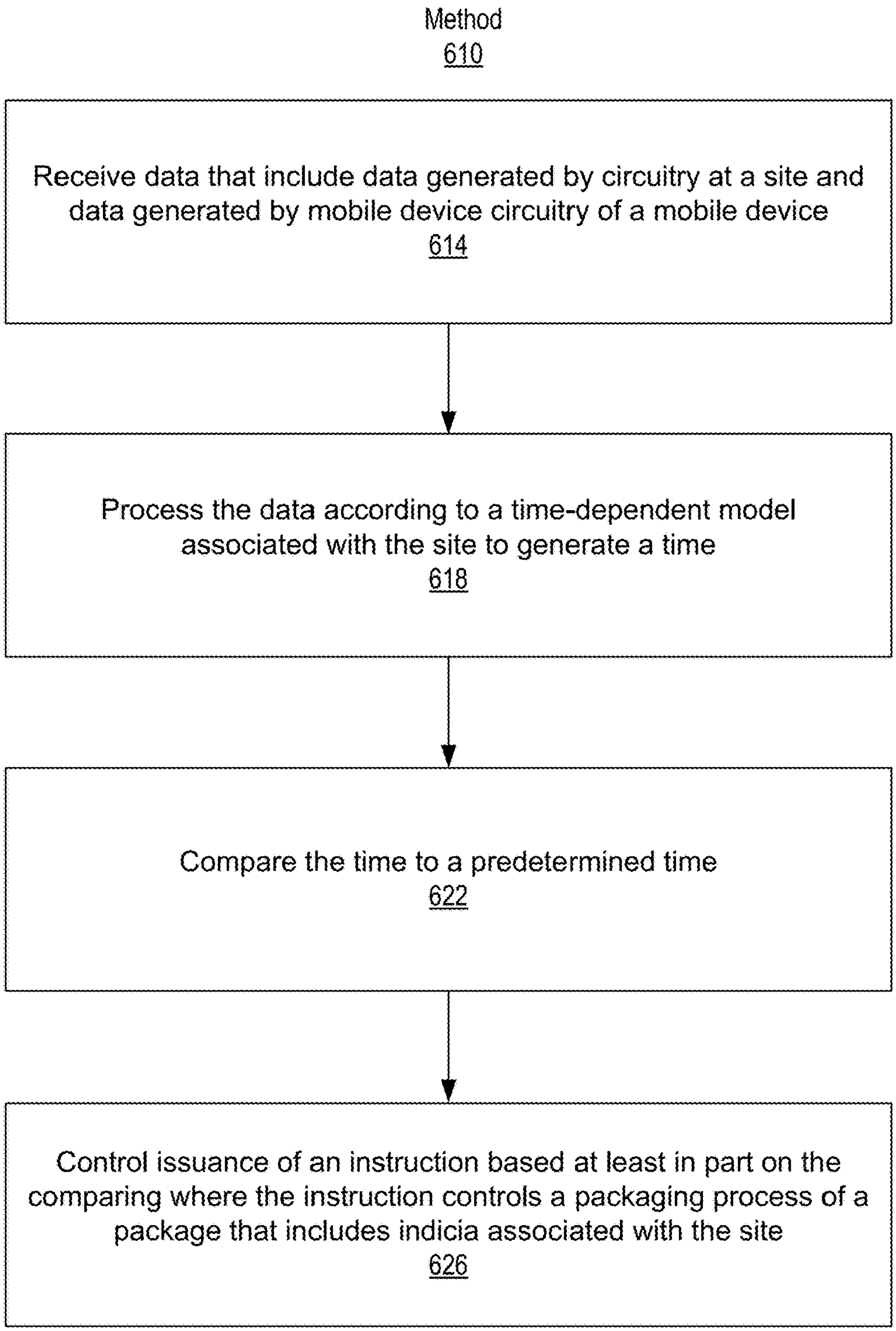
FIG. 6 is a diagram of an example of a method.

FIG. 6 shows an example of a method 600 that includes a reception block 614 for receiving data that include data generated by circuitry at a site and data generated by mobile device circuitry of a mobile device; a process block 618 for processing the data according to a time-dependent model associated with the site to generate a time; a comparison block 622 for comparing the time to a predetermined time; and a control block 626 for controlling issuance of an instruction based at least in part on the comparing where the instruction controls a packaging process of a package that includes indicia associated with the site. The method 600 may be implemented at least in part via a controller such as, for example, the controller 160 of FIG. 1, which may be an embedded controller that is embedded into one or more types of equipment (e.g., a voice-enabled assistant, a router, a mobile phone, a server, etc.).

As to the control block 626 for controlling issuance of an instruction based at least in part on the comparing where the instruction controls a packaging process of a package that includes indicia associated with the site, consider the instruction being a time based instruction and/or being an amount of goods instruction. For example, where an individual uses protein powder with a shelf life of approximately four months, the instruction may be time-based in that the time-dependent model indicates that consumption of goods (e.g., usage) is “ahead of schedule” and that the individual’s supply is running short. If the control data indicate delivery of two 250 gram bottles every 2 months (e.g., 500 grams), and the usage is running at 1000 grams every 2 months (e.g., 500 grams per month), options can include increasing delivery frequency to two 250 gram bottles every month (e.g., 500 grams per month; 1000 grams total over two months) or increasing the delivery amount of goods to four 250 gram bottles every 2 months (e.g., 1000 grams total for two months). In such an example, the amount of goods delivered may increase while remaining within a constraint such as the four month shelf life of the goods. As an example, if data indicate (e.g., per a time-dependent model) that the usage is less, for example, at 250 grams per 2 months (e.g., 125 grams per month), the frequency of delivery could be shifted from every 2 months to every 4 months while remaining within the four month shelf life; whereas, if the shelf life were 3 months, then an option to adjust can be to maintain the frequency at every 2 months while reducing the amount of goods (e.g., one 250 gram bottle). As an example, a system can include a time-dependent model as to goods themselves where, for example, environmental data may be utilized to determine whether a shelf-life is shortened (e.g., hotter, high humidity storage) or extended (e.g., cooler, low humidity storage).

As an example, a method can include generating options and rendering such options via a graphical user interface of a device such as a computer, a tablet, a mobile phone, a wearable, etc., where the graphical user interface can be utilized to receive user input and generate a signal (e.g., an instruction, a command, etc.) as to a selected option. In such an example, an individual can be part of a control scheme that may be considered to be semi-automated as options can be generated automatically and presented to the individual for selection of one of the options to thereby adjust control data.

As an example, a system may optionally include specific data for particular goods such as wine, where environmental conditions and ageing may be related. As an example, a system may generate a consumption indicator, which may be accompanied with scheduled delivery data and/or dynamic delivery data. In such an example, a system can generate a notice such as “drink wine XY within Z days”, which may be transmitted to a mobile or other device and rendered to a display, optionally as a GUI with one or more graphic controls (e.g., to affirm, to re-order, to order another wine, etc.).

As an example, the controller 160 of FIG. 1 may be distributed in that one or more portions of the controller are executed using first equipment and one or more portions of the controller are executed using second equipment, etc. In such an example, a portion can be local at a site and another portion can be remote from the site (e.g., cloud-based, etc.). As an example, consider a local portion being embedded in a VEA or router and a remote portion being embedded in a server that is in communication with the VEA or router (e.g., can receive and/or transmit data to the VEA or router). In such an example, the VEA or router can be a hub that acquires data from one or more local pieces of equipment and the server can provide computational resources for generating, adjusting, etc., a time-dependent model using at least a portion of the acquired data. In such an example, consider a server that can generate, adjust, etc., a kernel model, a machine model, etc. As an example, a time-dependent model can be or include a neural network model that can be trained using data associated with a site or sites. As an example, such a model can be generated using technology such as TENSOR FLOW technology (Google, Mountain View, California). As an example, a computational framework can include an analysis engine that can include one or more features of the TENSOR FLOW framework, which includes a software library for dataflow programming that provides for symbolic mathematics, which may be utilized for machine learning applications such as artificial neural networks (ANNs), etc.

Figure 7:
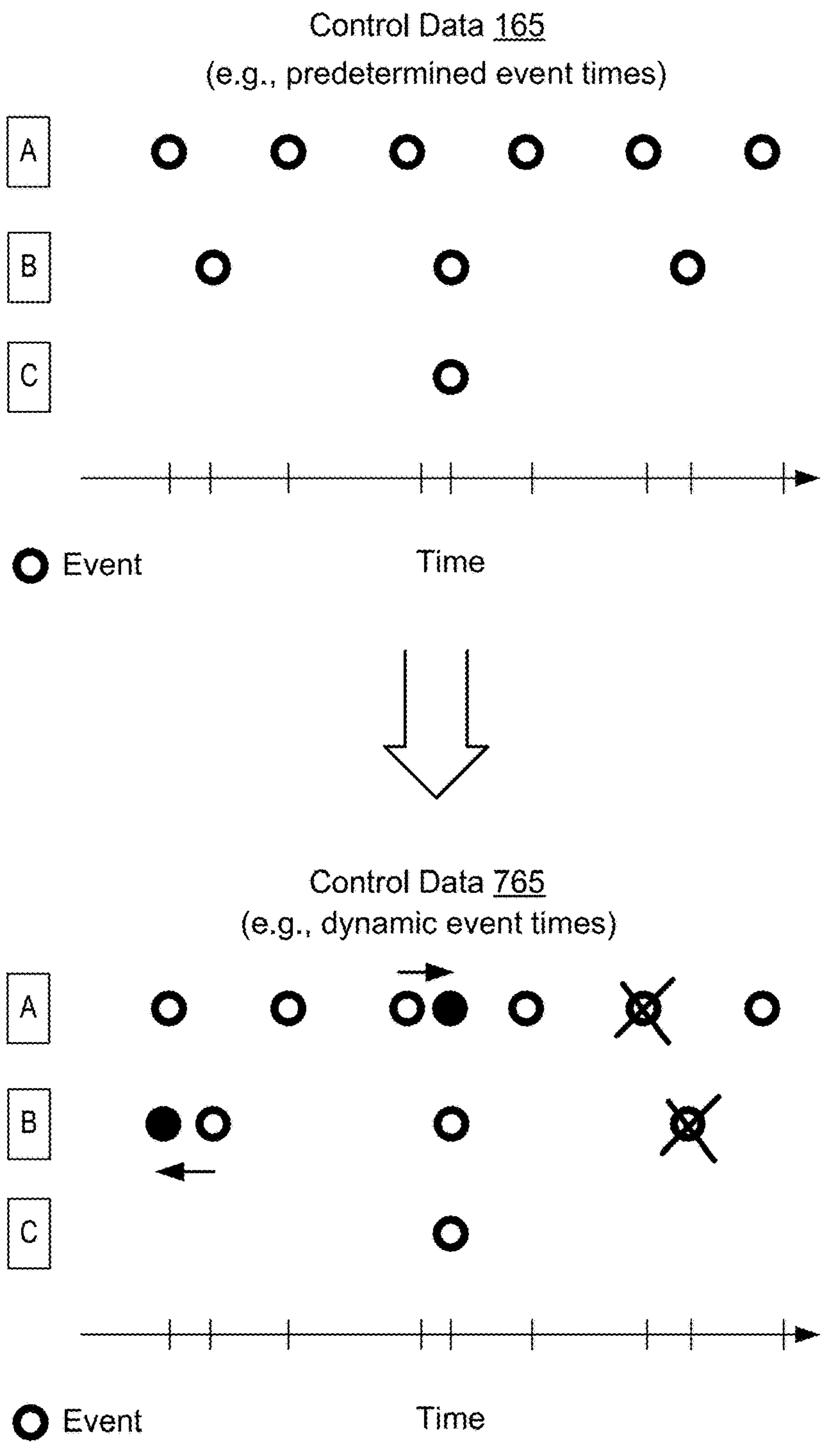
FIG. 7 is a diagram of examples of control data.

As explained, a system such as the system 100 of FIG. 1 can adjust control data. FIG. 7 shows the example of the control data 165 of FIG. 2 along with an adjusted version of the control data 765, which can be adjusted dynamically, for example, utilizing one or more features of the system 100 of FIG. 1 (e.g., using the controller 160, etc.). As shown in FIG. 7, the subscription model A can be adjusted to cancel an event and/or to shift an event in time. As an example, an event may be shifted in time using control data from one or more other subscription models. For example, the adjustment of the third event is shifted to coincide with the second event of the subscription model B and the event of the subscription model C (noting that the timeline may correspond to a cycle that repeats in time). Such an approach may offer opportunities for savings as to transportation, etc. For example, where goods of the subscription models A, B and C are provided by a fulfillment center the goods may be packaged in a common package (e.g., box). Such an approach may be referred to as synchronized delivery.

As an example, a system such as the system 100 of FIG. 1 may process generated data to determine a relationship between goods. For example, consider detergent for washing clothes and dryer clothes softener sheets. Where such a relationship is determined, a system may dynamically adjust control data to coordinate delivery of the related goods. Such an approach can facilitate receiving and following actions at a site. For example, referring to FIG. 4, the individual 409 can receive a single box with different, related goods (related via machine learning or other data-based technique), unpackage the goods and store the goods at the same time (e.g., in a laundry room). Such an approach adheres to principles of LEAN, which aims to reduce waste. Such an approach can provide efficiencies for the individual 409 as what otherwise would have been two unboxings is now only one and, the individual 409 may save on trips to the laundry room for storing the related goods (e.g., one trip versus two trips). The example of dryer sheets and detergent is one example of various possible examples that may be uncovered (e.g., determined) using various types of data from various types of equipment associated with a site (e.g., and an individual that has entered into one or more subscription models for goods).

Referring again to the control data 765 (e.g., adjusted control data), note that the first event of the subscription model B is shifted to be earlier in time; whereas, as mentioned, the third event of the subscription model A is shifted to be later in time. As mentioned, various types of generated data can indicate that timing of an event (e.g., a delivery event) can be shifted to be earlier or later. As an example, an adjustment may include a frequency adjustment where an interval between deliveries is shortened or lengthened and/or where an amount of goods per package is adjusted. As to the latter, consider control data as including amount of goods per package data. In such an example, control data can be adjusted without changing time but rather changing an amount of goods at each time (e.g., to be more or lesser).

Figure 8:
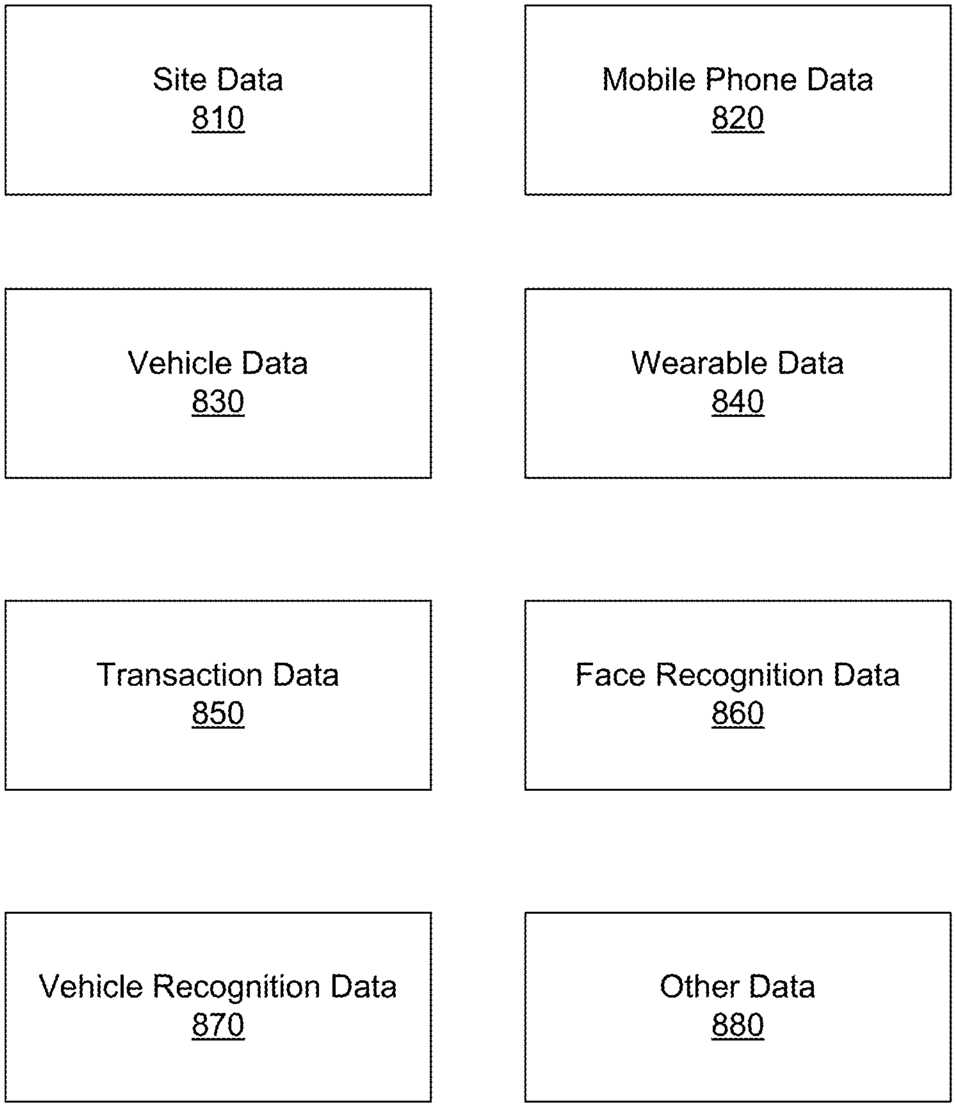
FIG. 8 is a diagram of examples of data.

FIG. 8 shows some examples of types of data that may be utilized in a system such as, for example, the system 100 of FIG. 1. As shown, data can include one or more of site data 810, mobile phone data 820, vehicle data 830, wearable data 840, transaction data 850, face recognition data 860, vehicle recognition data 870, and other data 880.

Figure 9:
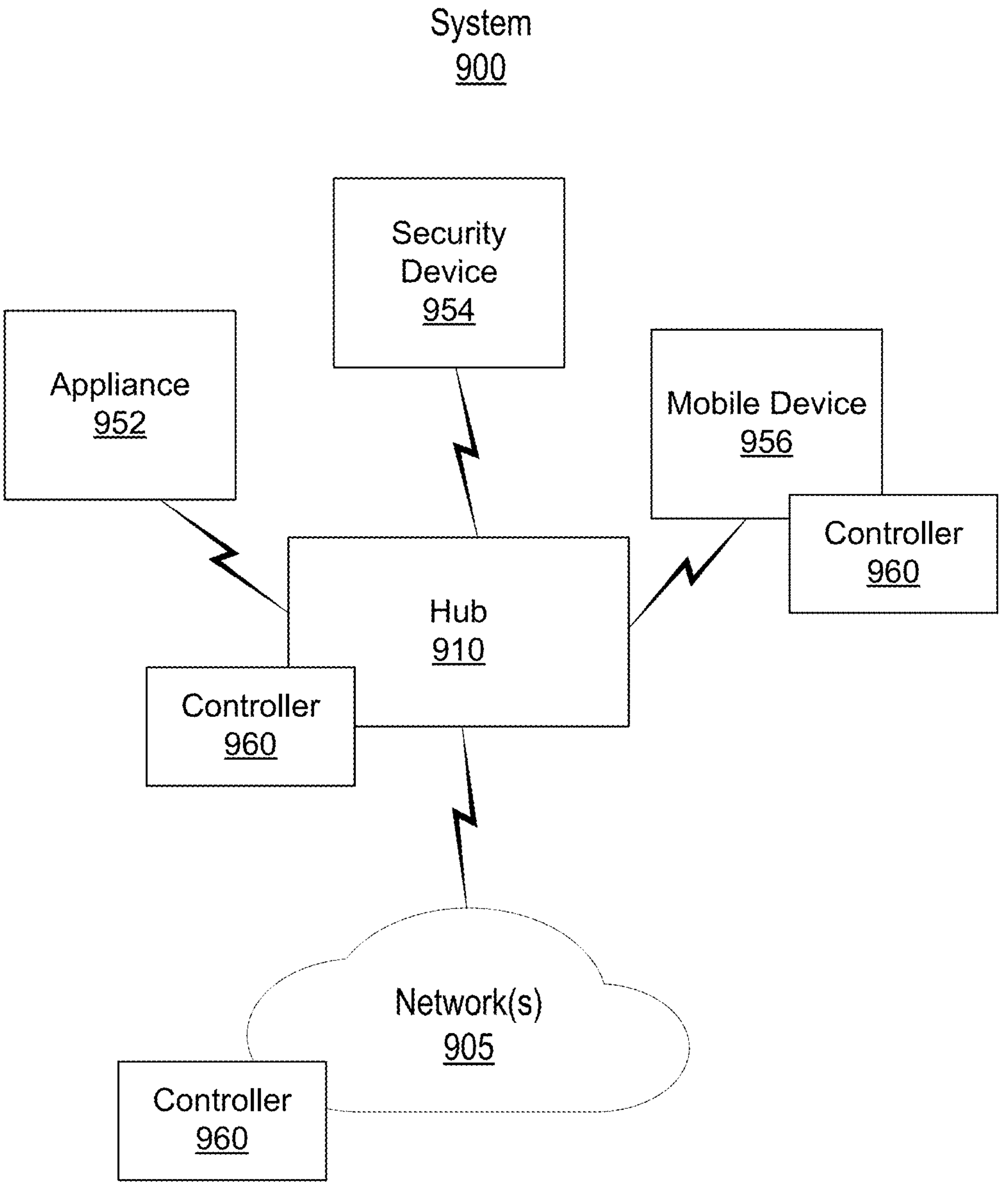
FIG. 9 is a diagram of an example of a system.

FIG. 9 shows an example of a system 900 that includes a hub 910, an appliance 952, a security device 954, and a mobile device 956 in communication with the hub 910 (e.g., a router, a smart home device, a VEA, etc.). As shown, the hub 910 is in communication with one or more networks 905. In the example of FIG. 9, one or more instances of a controller 960 can exist, which may be implemented, for example, via the mobile device 956 (e.g., via an app, etc.), via the hub 910 (e.g., via an application, etc.), and/or via a remote network resource or resources.

Figure 10:
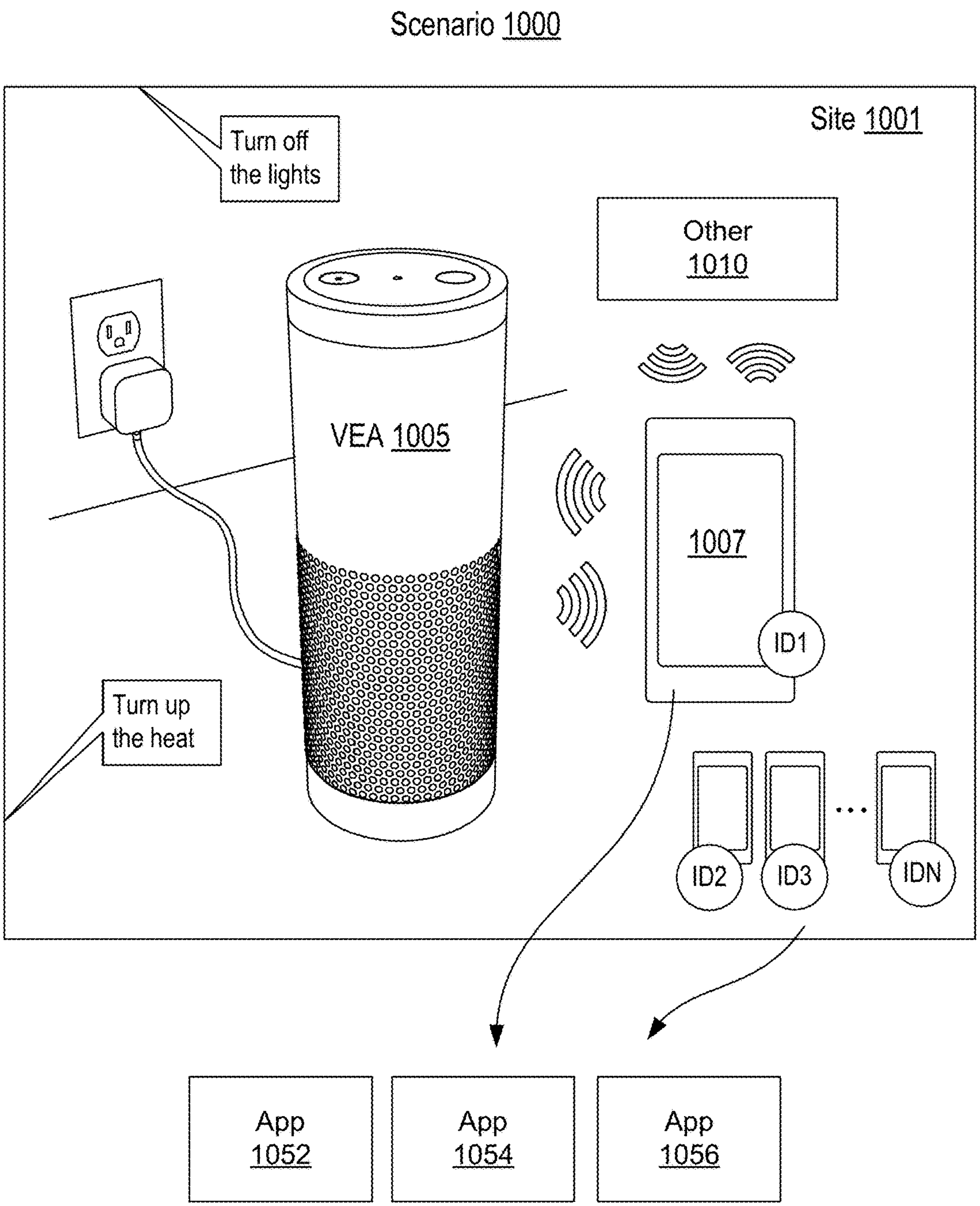
FIG. 10 is a diagram of an example of a scenario that includes an example of a voice-enabled assistant.

FIG. 10 shows an example of a scenario 1000 at a site 1001 that includes a voice-enabled assistant (VEA) 1005, which may be a hub. As shown, a mobile device 1007 and/or mobile devices and/or other device(s) 1010 can interact with the VEA 1005. As an example, the VEA 1005 may automatically connect with and/or detect proximity of one or more devices, which may be associated with one or more individuals (e.g., ID1 to IDN). In such a manner, the VEA 1005 can generate data germane to occupancy of the site and even identities of occupants (e.g., as inferred by generated data). As an example, the VEA 1005 may confirm occupancy via receipt of one or more voice instructions such as "turn off the lights", "turn up the heat", etc. As an example, the VEA 1005 can implement voice recognition that can determine a likely speaker and associate that likely speaker with the presence of a mobile device to confirm occupancy of that speaker/individual at the site 1001. As shown in the example of FIG. 10, the mobile device 1007 can include one or more apps 1052, 1054 and 1056. Such apps may be associated with the VEA 1005 and/or one or more other types of services, devices, etc. As an example, an app may be associated with a subscription model for goods. In such an example, the app may provide data to the VEA 1005 and/or the VEA 1005 may provide data to the app. In such an example, coordinate control as to control data may occur such that the VEA 1005 and data acquired and/or generated by the VEA can be utilized in making one or more adjustments to control data such as the control data 165 of FIG. 1.

Figure 11:
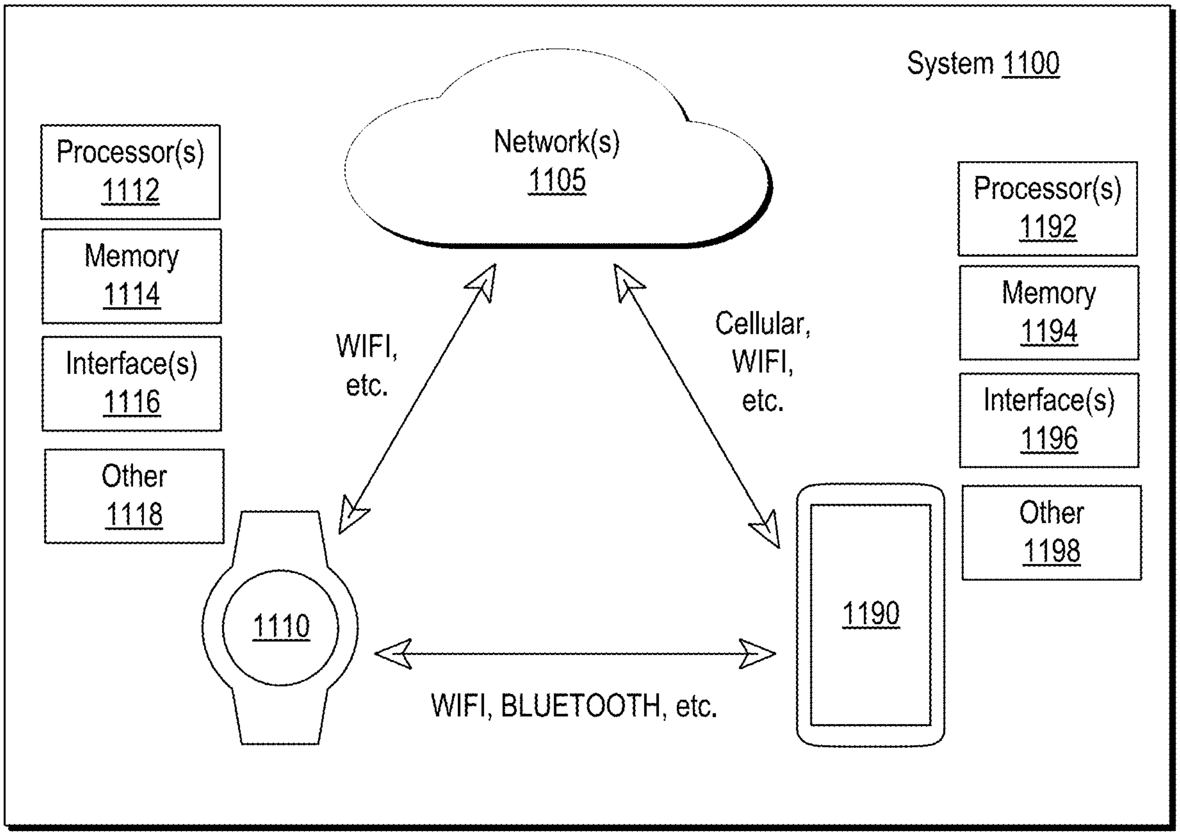
FIG. 11 is a diagram of an example of a system.

FIG. 11 shows an example of a system 1100 that includes a network or networks 1105, a wearable 1110 and a mobile phone 1190. As shown, the wearable 1110 can include one or more processors 1112, memory 1114, one or more interfaces 1116 and one or more other features 1118 and the mobile phone 1190 can include one or more processors 1192, memory 1194, one or more interfaces 1196 and one or more other features 1198. As an example, the system 1100 can include a VEA and/or a hub. For example, the VEA 1005 of FIG. 10 can be included in the system 1100.

Figure 12:
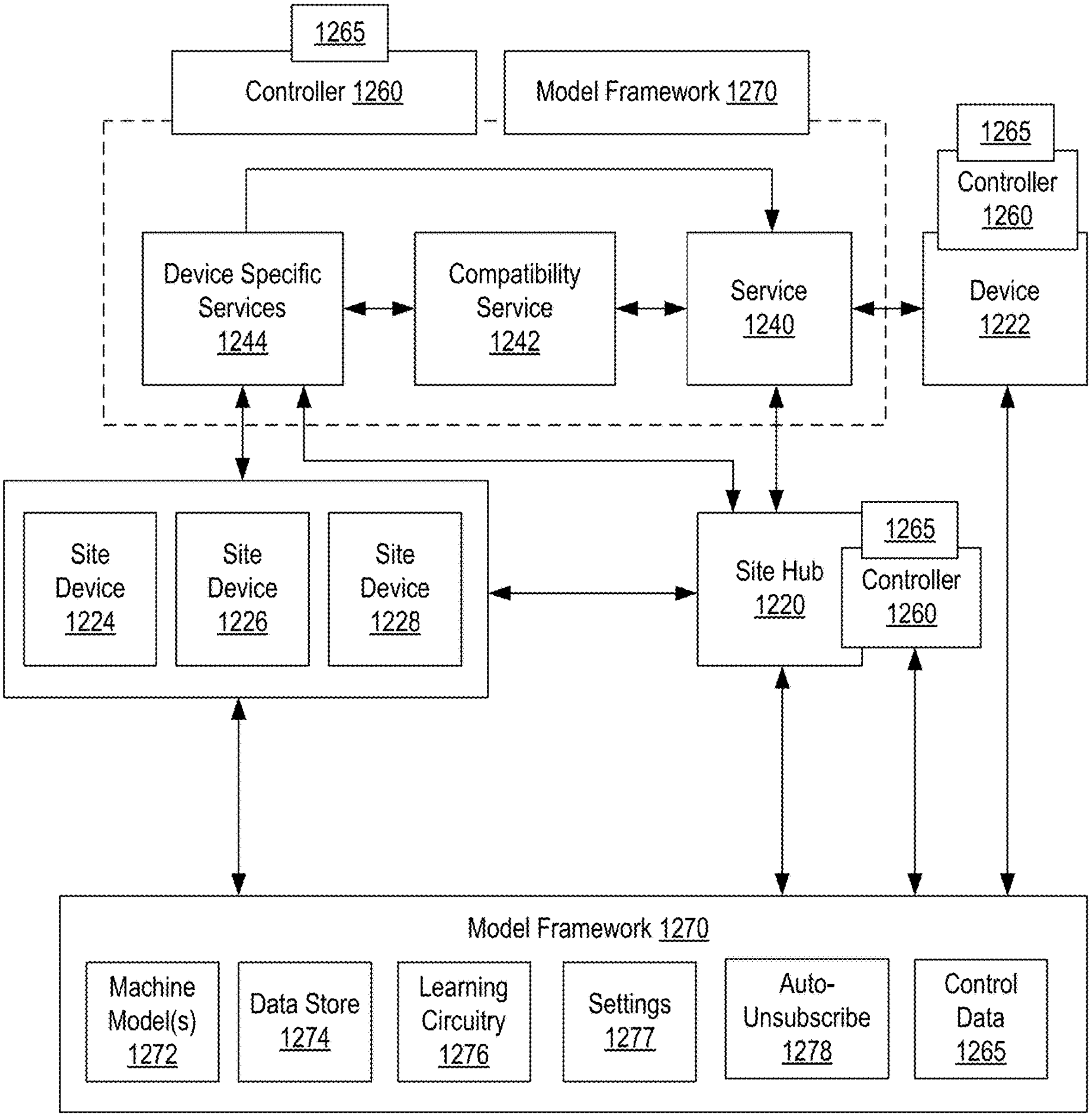
FIG. 12 is a diagram of an example of a system.

FIG. 12 shows an example of a system 1200. As shown, the system 1200 includes a site hub 1220 (e.g., a router, a server, a VEA, etc.), a device 1222 (e.g., a mobile device), site devices 1224, 1226 and 1128, a service 1240, a controller 1260 and a model framework 1270. As shown, the service 1240 can be remote from the site hub 1220 and operatively coupled to a compatibility service 1242 and one or more device specific services 1244, which can be operatively coupled to the one or more site devices 1224, 1226 and 1228. As shown, the controller 1260 can exist as or in association with one or more components of the system 1200. As an example, the controller 1260 can be the controller 160 of the system 100 of FIG. 1.

As to the model framework 1270, it can include one or more machine models 1272, a data store 1274, learning circuitry 1276, settings 1277, an automatic unsubscribe module, and control data 1265. As shown, the model framework 1270 can receive various types of data and operate on various types of data. As an example, the model framework 1270 can generate a time-dependent model that can be utilized to adjust the control data 1265. As an example, an adjustment can include unsubscribing from a subscription model for goods, which may occur automatically depending on analysis and processing of data by the model framework 1270. For example, if a subscription model is for delivery of packages of cat food and data of a site as generated by one or more devices indicates that a cat is no longer present at the site, the subscription model for the cat food may be canceled via an unsubscribe process, which may be available at a website. For example, the model framework 1270 can include accessing a website and/or emailing and/or calling a supplier to unsubscribe automatically. In such an example, an individual need not remember to unsubscribe and thereby save money and avoid waste of having unneeded cat food delivered (e.g., or other type of goods, etc.).

As mentioned, a model can be a machine model that can be trained to generate a trained machine model. As an example, as data are generated and acquired, such a model can be re-trained or updated. Such a model can be dynamic in that it can be revised in response to new data. As mentioned, technology such as TENSOR FLOW technology may be utilized to train such a model.

In the example of FIG. 12, the system 1200 can include one or more features of the AMAZON ALEXA framework and associated skills. As an example, a system such as the system 100 of FIG. 1 may automatically generate one or more skills responsive to data and processing thereof. For example, a skill may be generated as to one or more types of goods that can be packaged and delivered. As an example, a system may instruct a VEA to issue sound such as a sentence in the form of a question: "rice is running low, would you like to dynamically schedule delivery ahead of plan?" In such an example, a user may respond and thereby interact with the system to cause control data to be utilized for dynamic delivery (e.g., dynamic adjustment to a subscription for goods). As an example, a VEA may be programmed to "shop around", for example, to access pricing via the Internet, which may uncover a "better deal", which may be presented via sound: "Interested in a better deal?" A user may respond to hear details or dismiss. In such an example, the shop around feature may utilize data indicative of an individual's consumption of goods, etc., where that consumption may differ from that associated with an initial subscription for the goods.

A device can include various types of circuitry. For example, where a device such as an voice-enabled assistant (VEA) is utilized, it can include one or more speakers (e.g., woofer, tweeter, etc.), one or more microphones (e.g., a microphone array), one or more lights, one or more volume controls, a remote control unit, a step-down regulator optionally with an integrated switcher, a lower power multichannel audio codec, an audio signal amplifier, a digital media processor, random access memory (RAM), flash memory, a Wi-Fi module, a BLUETOOTH module, an integrated power management integrated circuit (IC), one or more programmable multi-output LED drivers, one or more low power multichannel audio signal analog to digital converters (ADC), one or more dual positive-edge-triggered D-type flip-flops, etc.

As an example, a device can include one or more features of a device such as, for example, the AMAZON ECHO device, which includes a woofer with a reflex port, a tweeter, a 7-microphone array, a light ring volume adjustment, a remote control, a Texas Instruments TPS53312 step-down regulator with integrated switcher, a Texas Instruments TLV320DAC3203 ultra low power stereo audio codec, a Texas Instruments TPA3110D2 15 W filter-free class D stereo amplifier, a Texas Instruments DM3725CUS100 Digital Media Processor (DMP), Samsung K4X2G323PD-8GD8 256 MB LPDDR1 RAM, SanDisk SDIN7DP2-4G 4 GB iNAND ultra flash memory, a Qualcomm Atheros QCA6234X-AM2D Wi-Fi and BLUETOOTH Module, a Texas Instruments TPS65910A1 integrated power management IC, four Texas Instruments LP55231 programmable 9-output LED drivers, four Texas Instruments TLV320ADC3101 92 dB SNR low power stereo ADCs, Texas Instruments SN74LVC74A dual positive-edge-triggered D-type flip-flops, and seven S1053 0090 V6 microphones.

As an example, a device can include circuitry that can offer weather from a weather service and news from a variety of sources, including local radio stations, BBC, NPR, and ESPN from a service provider. As an example, a device can include circuitry that plays music from an account holder's one or more accounts with digital music providers and a device may include built-in support for streaming music services like IHEARTRADIO, PANDORA, SIRIUS XM, SPOTIFY and APPLE music, among one or more others. As an example, a device can include circuitry that provides support for IFTTT and NEST thermostats and/or one or more other environmental controllers for a site (e.g., HVAC controllers, etc.). As an example, a device can include circuitry that can play music from a music streaming service such as GOOGLE PLAY MUSIC, for example, from a smartphone and/or a tablet via a short-range communication link (e.g., BLUETOOTH, etc.).

As an example, a device can include circuitry that can provide for one or more voice-controlled alarms, timers, shopping and to-do lists and can access Web-based articles. As an example, a device can include circuitry that can respond to questions about items in a calendar, which may be locally and/or remotely based (e.g., local to a device in memory of the device, remotely stored in cloud-based resources, etc.). For example, consider a VEA uttering "Are you going on vacation for the next two weeks?" In such an example, an individual may respond with a "yes" or a "no" or, for example, "I don't know, remind me in a day". Such an approach can allow a system to acquire data via prompts, which can be generated using data indicative of a consumption pattern(s) for goods in relationship to a subscription for the goods.

As an example, a device can include circuitry that can integrate with features of one or more platforms (e.g., consider one or more of YONOMI, PHILIPS HUE, BELKIN WEMO, SMARTHINGS, INSTEON, WINK, COUNTERTOP, SONOS, SCOUT ALARM, GARAGEIO, TOYMAIL, MARA, MOJIO, etc.).

As an example, a device can include circuitry that can provide for "skills" (e.g., ALEXA Skills Kit, etc.). As an example, one or more third-party-developed voice applications may be provided to add to capabilities. Examples of skills can include, for example, an ability to play music, answer general questions, set an alarm, order a pizza, get an UBER ridesharing car, etc. As mentioned, a system may include generating questions that are specific, for example, based on acquired data indicative of consumption of goods, etc. The aforementioned ALEXA Skills Kit is a collection of self-service application programming interfaces (API), tools, documentation and code samples that can facilitate addition of skills. As an example, a Smart Home Skill API can be utilized, for example, to control cloud-controlled lighting and thermostat devices. As an example, code may be executed locally and/or remotely. As to remote execution, consider code that runs utilizing cloud-based resources.

As an example, a device can include communication circuitry such as telephonic communication circuitry (e.g., for SKYPE calls, etc.). As an example, a device can include and/or be operatively coupled to a display (e.g., for video capabilities, etc.).

As to the aforementioned Smart Home Skill API, such an API may provide for control of one or more of lights, switches and bulbs, door locks, entertainment devices like smart TVs, smart home cameras, thermostats and fans, microwave ovens, etc.

As an example, consider a use case where a device that is a voice-enabled assistant (VEA) receives sound waves from the voice of a person and converts them to digital data, for example, using an analog to digital converter. In such an example, the voice may say "turn the kitchen light to 50 percent". In such an example, the device can recognize the user's intent to change a setting on a specific device and use that information to create a message called a directive. The directive can include user authentication information (e.g., as associated with a site), an identifier for the device to be controlled, and the new setting value. The VEA can send this message to the Smart Home Skill that controls the light. As an example, the message may be received and parsed in code hosted in a remote (e.g., cloud-based) or in a local service that can pass it to the specified device (e.g., in a site-based network or networks of "things" such as an Internet of things (IoT) network). In such an example, a response message can indicate whether the request was successful or not. As an example, status requests may be made where a user can receive status of operational devices that can be in a site-based network.

As an example, a system can include device APIs, for example, as capability interfaces that describe a device's functionality. A device endpoint may implement a combination of capabilities that best model its features. For example, a light that can be turned on and off and dimmed implements two interfaces: PowerController and BrightnessController. If another light has these two capabilities, and also supports tunable white light, it could implement PowerController, BrightnessController and ColorTemperatureController.

As an example, a system can include synchronous and/or asynchronous messaging. For example, when a device directive is sent from a service, there can be a response, either synchronously, or asynchronously when the directive has been handled.

As an example, a system can provide for device state change notifications. For example, proactive state updates may be generated and transmitted and utilized to make one or more decisions as to adjustment of control data. For example, if a door unlocks in a manner that is detected by a site device, that change in status can be transmitted to a service where an app (e.g., a mobile phone app) can automatically show this change (e.g., via a graphical user interface, etc.).

As an example, a system can include querying capabilities, for example, allowing an individual to utilize a device to check the current state of a device (e.g., using a service, an app, a message, etc.).

As an example, wireless cell communication circuitry (e.g., cellular communication circuitry) can include XG (e.g., 3G, 4G, 5G, etc.), long-term evolution (LTE), or other type of circuitry. As an example, a system can include one or more subscriber identity module (SIM) cards (e.g., SIM circuitry). As an example, a system can include remote access circuitry, which may be via one or more types of networks (e.g., cable, digital subscriber line (DSL), satellite, cellular, etc.).

As an example, a system can include a processor; memory accessible to the processor; processor-executable instructions stored in the memory and executable by the processor to instruct the system to: receive data that include data generated by circuitry at a site and data generated by mobile device circuitry of a mobile device; process the data according to a time-dependent model associated with the site to generate a time; compare the time to a predetermined time; and control issuance of an instruction based at least in part on the comparison where the instruction controls a packaging process of a package that includes indicia associated with the site.

As mentioned, a system may include a time-dependent model that is a parametric model. As an example, a time-dependent model can include one or more parts, which may be independent and/or interdependent. As mentioned, a part of a time-dependent model can account for material (e.g., goods) themselves while another part of a time-dependent model can account for consumption of material (e.g., via one or more human actions and/or one or more machine actions).

As an example, delivery of packages can occur in a manner that is somewhat akin to dissolution of a pharmaceutical tablet and/or in a manner that is somewhat akin to administration of a pharmaceutical tablet (e.g., a patient swallowing a tablet), which may be scheduled per a subscription as written by a medical doctor (e.g., one tablet, twice a day). In such an example, the patient is expected to have a bottle of the tablets accessible at home where, after taking a tablet, the tablet can be metabolized and/or otherwise cleared by the body of the patient, which can depend on how the tablet dissolves. An aim in pharmaceuticals can be zero-order drug delivery (e.g., constant concentration with respect to time in the body), which is generally controlled timed taking of a tablet with a special composition that, after taking the tablet, provides for a predictable rate of dissolution that is matched to one or more rates of metabolism and/or clearance (e.g., via urine, breath, defecation, etc.) such that the concentration in the body remains relatively constant from taking to taking.

In a system such as the system 100 of FIG. 1, biological predictability may be taken into account; however, various dynamics do not necessarily follow biological dynamics as with a pharmaceutical tablet in a body. Yet, at some level, various dynamics may be represented via one or more models that find use in medicine (e.g., Noyes-Whitney, first-order rate, half-life, diffusion, reaction, convection, etc.). For example, a delivery process can be specified according to a schedule, which may be somewhat akin to a subscription written by a doctor; however, such a delivery process may, for example, be modeled via a time-dependent model akin to dissolution of a tablet (e.g., in a step-wise or incremental manner), which may optionally account for chemical changes in a product itself and/or actions taken with respect to the product (e.g., human and/or machine). Additionally, or alternatively, a time-dependent model can account for actions taken with respect to the product itself (e.g., human and/or machine) via a rate or rates as to consumption and/or clearance (e.g., akin to biological metabolism and/or clearance). As an example, a model can include one or more of a subscription model, a convective transport model, a diffusion model, a reaction model, and a clearance model, each of which may optionally be discrete rather than continuous or, for example, a combination of discrete and continuous. Such an approach differs in various manners from a pharmaceutical approach as the pharmaceutical approach generally involves a subscription as to discrete events (e.g., take a tablet once a day) followed by pharmacological events (e.g., dissolution, reaction and clearance). A system such as the system 100 of FIG. 1 can control the occurrence of discrete events dynamically by adjusting control data associated with a subscription (e.g., predetermined event times) using a time-dependent model (or models) that accounts for factors that include factors that are not isolated to a single human body's processing of a pharmaceutical tablet in a manner that does not depend on where that individual may be, the individual's actions, operation of one or more machines, etc. In medicine, a doctor's professional advice manually determines dosage and timings; whereas, as explained, a controller can adjust a schedule (e.g., control data) dynamically through use of various computing devices, which may be part of an IoT mesh, etc.

As an example, a system can receive data that include data generated by circuitry at a site (e.g., a modem, a router, an appliance, a VEA, etc. at a home or facility) and data generated by mobile device circuitry of a mobile device (e.g., a user's mobile phone, smartwatch, fitness tracker, car, bicycle, etc.). As an example, a time-dependent model can be a "smart model" that is based on and/or includes a subscription model or subscription models. Such subscription models can be commercial models as may be with a supplier of goods (e.g., consider an AMAZON merchant as a supplier that has a schedule to delivery X amount of goods every Y weeks for a cost of Z). As mentioned, machine learning may be utilized to train (e.g., learn) a machine model that is a trained (e.g., a learned) machine model. Such a model can include various parameters and can receive input and generate output, which may be, for example, a time (e.g., a predicted time) and/or output from which a time may be predicted. As an example, a system can provide for comparing a time (e.g., a predicted time) to a predetermined time (e.g., a scheduled time of a subscription model). As an example, control can be implemented in a system that is direct or indirect to get goods packaged and transported where a package includes indicia that can be a home address (e.g., a delivery address, delivery coordinates, etc.).

As an example, a system can include circuitry and a network interface that receives data generated by a mobile device. For example, a system can be embedded in a VEA, a router, an IoT mesh hub, etc., that can establish a network connection with a mobile device and/or sense presence of a mobile device (e.g., due to proximity, energy broadcast by the mobile device, etc.). As an example, a system can be a server, which may be, for example, a server that is part of a server-farm, which may be a server-farm of a cloud architecture.

As an example, a system can include instructions that access a schedule that includes at least a predetermined time. Such a scheduled can be, for example, a schedule of a subscription for goods as may be packaged in a package or packages and transported.

As an example, data generated by mobile device circuitry of a mobile device can include geolocation data. As an example, a system can include instructions to process data where the instructions associate geolocation data with a first type of facility that is remote from a site and where, for the first type of facility, a time-dependent model generates a time that is less than the predetermined time. For example, consider a first type of facility that is a "use" facility that accelerates "use" of goods (e.g., a gym as a facility that is indicative of accelerated use of protein powder, etc.). As an example, a system can include instructions to process data where the instructions associate geolocation data with a second type of facility that is remote from a site and where, for the second type of facility, a time-dependent model generates a time that is greater than a predetermined time. For example, consider a second type of facility that is a "non-use" facility that decelerates "use" of goods (e.g., a workplace as a facility that is indicative of decelerated use of protein powder, etc.).

As an example, a system can receive data generated by circuitry at a site where such data can include power usage data (e.g., oven, fireplace, water heater, refrigerator, wash machine, electric razor, vacuum cleaner, etc.). As an example, a system can process data in a manner that compares power usage data to a usage model to determine a usage indicator where, for an over usage indicator, a time-dependent model generates a time that is less than a predetermined time. As an example, a system can process data in a manner that compares power usage data to a usage model to determine a usage indicator where, for an under usage indicator, a time-dependent model generates a time that is greater than a predetermined time.

As an example, power usage data can include one or more of electrical power usage data, gas power usage data, or other type of power usage data. As an example, a system may receive generated data that can be solar power data, which may correspond to a solar power generation system. As an example, geothermal power data may be generated and received for purposes of determining a time or times (e.g., via a time-dependent model).

As an example, a system can include instructions that, based on at least a portion of data, determine an occupancy schedule for a site. For example, consider data generated by mobile device circuitry of a mobile device where the circuitry is, or includes, wearable mobile device circuitry of a wearable mobile device. As another example, consider circuitry at a site that generates site security data. As an example, such data can be or include object detection data (e.g., one or more objects detected via video, audio, motion, heat, etc.). As an example, data generated by circuitry at a site can include site environmental control data (e.g., via an HVAC system, weather sensors, etc.). As an example, a system can include instructions to control issuance of an instruction based at least in part on a comparison where the instruction can be issued based at least in part on an occupancy schedule for a site. For example, where a site is unoccupied due to a calendared vacation (e.g., as may be indicated in data generated in a calendar app of a mobile device, etc.), a controller may issue an instruction that halts and/or reschedules a packaging process to occur at a later time (e.g., later than a predetermined time). While a calendar is mentioned, as an example, a system can learn occupancy, which may span a period of weeks, months or more. For example, consider a "snowbird" that occupies one site during the summer months and another site during winter months. In such an example, a system may be operatively coupled to one or more of the sites such that control decisions can be made using data of one or more of the sites. As an example, one site may be instrumented whereas the other site is not; yet, the system can infer that the non-instrumented site is occupied based at least in part on the instrumented site being vacant (e.g., non-occupied). In such an approach, a control decision may be made to issuance an instruction that alters at least an indicia (e.g., or indicium), for example, for a package such that the package is to be transported to the non-instrumented site (e.g., via truck, drone, etc.). As an example, the indicia can be an address, which may be a post office box, a street address, geographical coordinates, etc.

As an example, a method can include receiving data that include data generated by circuitry at a site and data generated by mobile device circuitry of a mobile device; processing the data according to a time-dependent model associated with the site to generate a time; comparing the time to a predetermined time; and controlling issuance of an instruction based at least in part on the comparing where the instruction controls a packaging process of a package that include indicia associated with the site.

As an example, one or more computer-readable storage media can include computer-executable instruction executable to instruct a computing system to: receive data that include data generated by circuitry at a site and data generated by mobile device circuitry of a mobile device; process the data according to a time-dependent model associated with the site to generate a time; compare the time to a predetermined time; and control issuance of an instruction based at least in part on the comparison where the instruction controls a packaging process of a package that includes indicia associated with the site. As an example, such a computing system can include one or more features of the system 100 of FIG. 1 (e.g., one or more features of the controller 160, etc.).

As described herein, various acts, steps, etc., may be implemented as instructions stored in one or more computer-readable storage media where a computer-readable storage medium is not a signal. For example, one or more computer-readable storage media can include computer-executable (e.g., processor-executable) instructions to instruct a device. A computer-readable medium may be a computer-readable medium that is not a carrier wave.

The term "circuit" or "circuitry" is used in the summary, description, and/or claims. The term "circuitry" includes various levels of available integration, e.g., from discrete logic circuits to the highest level of circuit integration such as VLSI, and includes programmable logic components programmed to perform the functions of an embodiment as well as special-purpose processors programmed with instructions to perform those functions. Such circuitry may optionally rely on one or more computer-readable media that includes computer-executable instructions. As described herein, a computer-readable medium may be a storage device (e.g., a memory chip, a memory card, a storage disk, etc.) and referred to as a computer-readable storage medium.

Figure 13:
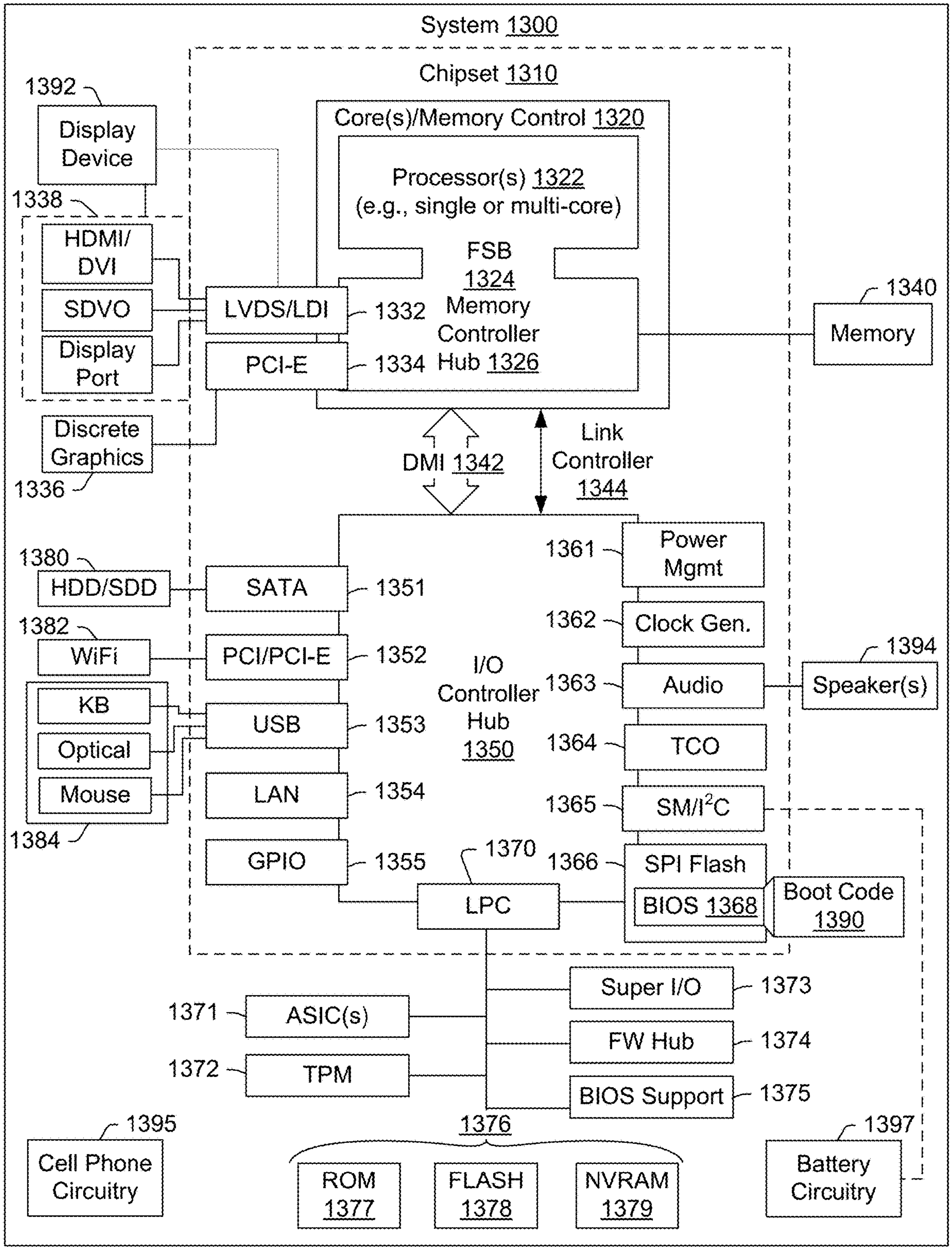
FIG. 13 is a diagram of an example of a system.

While various examples of circuits or circuitry have been discussed, FIG. 13 depicts a block diagram of an illustrative computer system 1300. The system 1300 may be a desktop computer system, such as one of the ThinkCentre® or ThinkPad® series of personal computers sold by Lenovo (US) Inc. of Morrisville, NC, or a workstation computer, such as the ThinkStation®, which are sold by Lenovo (US) Inc. of Morrisville, NC; however, as apparent from the description herein, a device or other machine may include other features or only some of the features of the system 1300.

As shown in FIG. 13, the system 1300 includes a so-called chipset 1310. A chipset refers to a group of integrated circuits, or chips, that are designed (e.g., configured) to work together. Chipsets are usually marketed as a single product (e.g., consider chipsets marketed under the brands INTEL, AMD, etc.).

In the example of FIG. 13, the chipset 1310 has a particular architecture, which may vary to some extent depending on brand or manufacturer. The architecture of the chipset 1310 includes a core and memory control group 1320 and an I/O controller hub 1350 that exchange information (e.g., data, signals, commands, etc.) via, for example, a direct management interface or direct media interface (DMI) 1342 or a link controller 1344. In the example of FIG. 13, the DMI 1342 is a chip-to-chip interface (sometimes referred to as being a link between a "northbridge" and a "southbridge").

The core and memory control group 1320 include one or more processors 1322 (e.g., single core or multi-core) and a memory controller hub 1326 that exchange information via a front side bus (FSB) 1324. As described herein, various components of the core and memory control group 1320 may be integrated onto a single processor die, for example, to make a chip that supplants the conventional "northbridge" style architecture.

The memory controller hub 1326 interfaces with memory 1340. For example, the memory controller hub 1326 may provide support for DDR SDRAM memory (e.g., DDR, DDR2, DDR3, etc.). In general, the memory 1340 is a type of random-access memory (RAM). It is often referred to as "system memory".

The memory controller hub 1326 further includes a low-voltage differential signaling interface (LVDS) 1332. The LVDS 1332 may be a so-called LVDS Display Interface (LDI) for support of a display device 1392 (e.g., a CRT, a flat panel, a projector, etc.). A block 1338 includes some examples of technologies that may be supported via the LVDS interface 1332 (e.g., serial digital video, HDMI/DVI, display port). The memory controller hub 1326 also includes one or more PCI-express interfaces (PCI-E) 1334, for example, for support of discrete graphics 1336. Discrete graphics using a PCI-E interface has become an alternative approach to an accelerated graphics port (AGP). For example, the memory controller hub 1326 may include a 16-lane (x16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 1350 includes a variety of interfaces. The example of FIG. 13 includes a SATA interface 1351, one or more PCI-E interfaces 1352 (optionally one or more legacy PCI interfaces), one or more USB interfaces 1353, a LAN interface 1354 (more generally a network interface), a general purpose I/O interface (GPIO) 1355, a low-pin count (LPC) interface 1370, a power management interface 1361, a clock generator interface 1362, an audio interface 1363 (e.g., for speakers 1394), a total cost of operation (TCO) interface 1364, a system management bus interface (e.g., a multi-master serial computer bus interface) 1365, and a serial peripheral flash memory/controller interface (SPI Flash) 1366, which, in the example of FIG. 13, includes BIOS 1368 and boot code 1390. With respect to network connections, the I/O hub controller 1350 may include integrated gigabit Ethernet controller lines multiplexed with a PCI-E interface port. Other network features may operate independent of a PCI-E interface.

The interfaces of the I/O hub controller 1350 provide for communication with various devices, networks, etc. For example, the SATA interface 1351 provides for reading, writing or reading and writing information on one or more drives 1380 such as HDDs, SDDs or a combination thereof. The I/O hub controller 1350 may also include an advanced host controller interface (AHCI) to support one or more drives 1380. The PCI-E interface 1352 allows for wireless connections 1382 to devices, networks, etc. The USB interface 1353 provides for input devices 1384 such as keyboards (KB), one or more optical sensors, mice and various other devices (e.g., microphones, cameras, phones, storage, media players, etc.). On or more other types of sensors may optionally rely on the USB interface 1353 or another interface (e.g., $I^2C$, etc.). As to microphones, the system 1300 of FIG. 13 may include hardware (e.g., audio card) appropriately configured for receipt of sound (e.g., user voice, ambient sound, etc.).

In the example of FIG. 13, the LPC interface 1370 provides for use of one or more ASICs 1371, a trusted platform module (TPM) 1372, a super I/O 1373, a firmware hub 1374, BIOS support 1375 as well as various types of memory 1376 such as ROM 1377, Flash 1378, and non-volatile RAM (NVRAM) 1379. With respect to the TPM 1372, this module may be in the form of a chip that can be used to authenticate software and hardware devices. For example, a TPM may be capable of performing platform authentication and may be used to verify that a system seeking access is the expected system.

The system 1300, upon power on, may be configured to execute boot code 1390 for the BIOS 1368, as stored within the SPI Flash 1366, and thereafter processes data under the control of one or more operating systems and application software (e.g., stored in system memory 1340). An operating system may be stored in any of a variety of locations and accessed, for example, according to instructions of the BIOS 1368. Again, as described herein, a satellite, a base, a server or other machine may include fewer or more features than shown in the system 1300 of FIG. 13. Further, the system 1300 of FIG. 13 is shown as optionally include cell phone circuitry 1395, which may include GSM, CDMA, etc., types of circuitry configured for coordinated operation with one or more of the other features of the system 1300. Also shown in FIG. 13 is battery circuitry 1397, which may provide one or more battery, power, etc., associated features (e.g., optionally to instruct one or more other components of the system 1300). As an example, a SMBus may be operable via a LPC (see, e.g., the LPC interface 1370), via an $I^2C$ interface (see, e.g., the SM/$I^2C$ interface 1365), etc.

Although examples of methods, devices, systems, etc., have been described in language specific to structural features and/or methodological acts, it is to be understood that the subject matter defined in the appended claims is not necessarily limited to the specific features or acts described.

Rather, the specific features and acts are disclosed as examples of forms of implementing the claimed methods, devices, systems, etc.

What is claimed is:

1. A system comprising:

an environmental control unit that controls operation of heating, ventilation and air conditioning equipment at a site for a home environment of the site occupiable by humans;

a voice-enabled assistant device operatively coupled to the environmental control unit, wherein the voice-enabled assistant device transmits commands to the environmental control unit and receives time series temperature data from the environmental control unit for temperature of the home environment at the site; and a remote server operatively coupled to the voice-enabled assistant device, wherein the remote server receives the time series temperature data from the voice-enabled assistant device and uses a time-dependent model to determine a depletion rate for material at the site, wherein the time-dependent model accounts for consumption of the material with respect to time, based at least in part on the time series temperature data of the home environment, and degradation of the material with respect to time, based at least in part on the time series temperature data of the home environment.

2. The system of claim 1, wherein the remote server determines a depletion time for the material.

3. The system of claim 1, wherein the voice-enable assistant device receives a command from the remote server and, in response, generates an audible query related to depletion of the material.

4. The system of claim 3, wherein the voice-enabled assistant device receives an audible response to the audible query and converts the audible response to a digital signal, wherein the remote server receives the digital signal from the voice-enabled assistant device and determines the depletion rate for the material based at least in part on the digital signal.

5. The system of claim 1, wherein the voice-enabled assistant device receives power usage data from operation of circuitry at the site and wherein the remote server receives the power usage data and compares the power usage data to a power usage model to determine a power usage indicator.

6. The system of claim 5, wherein the remote server determines the depletion rate for the material based at least in part on the power usage indicator.

7. The system of claim 1, comprising a mobile device that generates a graphical user interface that lists selectable options associated with depletion of the material at the site, wherein, responsive to selection of one of the options, the remote server receives a notification as to selection of the one of the options.

8. The system of claim 1, comprising a mobile device that generates geolocation data and transmits the geolocation data to the voice-enabled assistant device, wherein the remote server receives the geolocation data from the voice-enabled assistant device and determines the depletion rate based at least in part on the geolocation data.

9. The system of claim 1, comprising a wearable device that generates indications of the material at the site being placed into a refrigerator and being taken out of a refrigerator, wherein the wearable device transmits the indications to the voice-enabled assistant device and wherein the remote server receives the indications from the voice-enabled assistant device and determines the depletion rate based at least in part on the indications.

10. The system of claim 1, comprising a camera, operatively coupled to the voice-enabled assistant device, that generates object detection data, wherein the remote server receives the object detection data from the voice-enabled assistant device and determines the depletion rate based at least in part on the object detection data.

11. The system of claim 1, wherein the time-dependent model comprises an artificial neural network model trained using data associated with at least the site.

12. The system of claim 11, wherein the remote server re-trains the artificial neural network model responsive to receipt of additional data associated with at least the site.

13. The system of claim 11, wherein the data associated with at least the site comprise at least a portion of the time series temperature data of the home environment.

14. The system of claim 13, wherein the artificial neural network model is trained to learn a temperature dependent occupancy pattern of the home environment.

15. The system of claim 11, wherein the remote server predicts a depletion time for the material at the site based at least in part on output of the artificial neural network model.

16. The system of claim 15, wherein the remote server issues a control instruction to equipment based at least in part on the predicted depletion time.

17. The system of claim 1, wherein the voice-enabled assistant device generates occupancy data for the site responsive to receipt of an audible command, and wherein the remote server receives the occupancy data from the voice-enabled assistant device and determines the depletion rate based at least in part on the occupancy data.

18. The system of claim 1, wherein the voice-enabled assistant device comprises a microphone, a speaker, a processor, memory and a network interface.

19. The system of claim 1, wherein the remote server comprises a model framework that generates the time-dependent model.

20. The system of claim 19, wherein the remote server adjusts control data associated with the material using the time-dependent model.

* * * * *